(12) United States Patent
Schlanger

(10) Patent No.: US 11,001,097 B2
(45) Date of Patent: May 11, 2021

(54) SPOKED VEHICLE WHEEL

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 12 days.

(21) Appl. No.: 15/984,400

(22) Filed: May 20, 2018

(65) Prior Publication Data

US 2018/0264877 A1  Sep. 20, 2018

Related U.S. Application Data

(63) Continuation-in-part of application No. 15/420,118, filed on Jan. 31, 2017, now Pat. No. 10,493,796, and a continuation-in-part of application No. 15/412,151, filed on Jan. 23, 2017, now Pat. No. 10,814,671, which is a continuation-in-part of application No. 14/641,615, filed on Mar. 9, 2015, now Pat. No. 9,815,321, which is a continuation-in-part of application No. 12/930,643, filed on Jan. 13, 2011, now Pat. No. 8,985,709, which is a continuation-in-part of application No. 12/806,064, (Continued)

(51) Int. Cl.

| B60B 1/04  | (2006.01) |
| B60B 1/02  | (2006.01) |
| B60B 1/00  | (2006.01) |
| B60B 5/02  | (2006.01) |
| B60B 31/02 | (2006.01) |
| B60B 31/00 | (2006.01) |

(52) U.S. Cl.
CPC .............. *B60B 1/043* (2013.01); *B60B 1/003* (2013.01); *B60B 1/02* (2013.01); *B60B 1/0215* (2013.01); *B60B 5/02* (2013.01); *B60B 31/005* (2013.01); *B60B 31/02* (2013.01); *B60B 2310/226* (2013.01); *B60B 2310/318* (2013.01); *B60B 2320/122* (2013.01); *B60B 2360/341* (2013.01); *B60B 2900/111* (2013.01); *B60B 2900/116* (2013.01); *B60B 2900/1216* (2013.01); *B60B 2900/311* (2013.01); *B60B 2900/572* (2013.01); *B60Y 2200/13* (2013.01); *Y02T 10/86* (2013.01)

(58) Field of Classification Search
CPC .. B60B 1/00; B60B 1/003; B60B 1/02; B60B 1/04; B60B 1/041; B60B 1/042; B60B 1/043; B60B 1/044; B60B 31/02
See application file for complete search history.

(56) References Cited

U.S. PATENT DOCUMENTS

| 392,252   | A | * | 11/1888 | Zimmermann | ........... B60B 1/00  |
|           |   |   |         |            | 29/894.333             |
| 3,695,780 | A | * | 10/1972 | Velkoff     | ................. B64C 11/001 |
|           |   |   |         |             | 416/189                |

(Continued)

*Primary Examiner* — Jason R Bellinger

(57) ABSTRACT

A vehicle wheel, including a rim, a hub, and a plurality of spokes, a first anchor to connect one of the spokes to one of the rim and hub at a connection interface. One of the spokes is pre-tensioned by a pre-tensioning means. The first anchor may be manipulated between: (i) a released orientation where the connection interface is longitudinally released from the spoke to permit independent longitudinal displacement therebetween; and (ii) an engaged orientation where the connection interface is longitudinally connected to said spoke to limit independent longitudinal displacement between the two and to maintain the pre-tension of said spoke. The pre-tensioning means is discreet from the first anchor.

28 Claims, 12 Drawing Sheets

Related U.S. Application Data filed on Aug. 5, 2010, now Pat. No. 8,657,387, which is a continuation-in-part of application No. 11/879,333, filed on Jul. 17, 2007, now Pat. No. 7,784,878, which is a continuation-in-part of application No. 10/755,653, filed on Jan. 12, 2004, now Pat. No. 7,357,460.

(60) Provisional application No. 62/603,215, filed on May 22, 2017, provisional application No. 62/289,389, filed on Feb. 1, 2016, provisional application No. 60/439,819, filed on Jan. 13, 2003.

(56) References Cited

U.S. PATENT DOCUMENTS

| | | | | |
|---|---|---|---|---|
| 4,844,552 | A | 7/1989 | Tsygankov | |
| 7,357,460 | B2* | 4/2008 | Schlanger | B60B 1/0261 301/104 |
| 7,784,878 | B2* | 8/2010 | Schlanger | B60B 1/003 301/104 |
| 8,657,387 | B2* | 2/2014 | Schlanger | B60B 1/003 301/104 |
| 8,985,709 | B2* | 3/2015 | Schlanger | B60B 1/003 301/104 |
| 9,815,321 | B2* | 11/2017 | Schlanger | B60B 1/003 |
| 9,944,114 | B2* | 4/2018 | Habermacher | B60B 1/003 |
| 10,493,796 | B2* | 12/2019 | Schlanger | B60B 21/025 |
| 2017/0129278 | A1* | 5/2017 | Schlanger | B60B 1/044 |

* cited by examiner

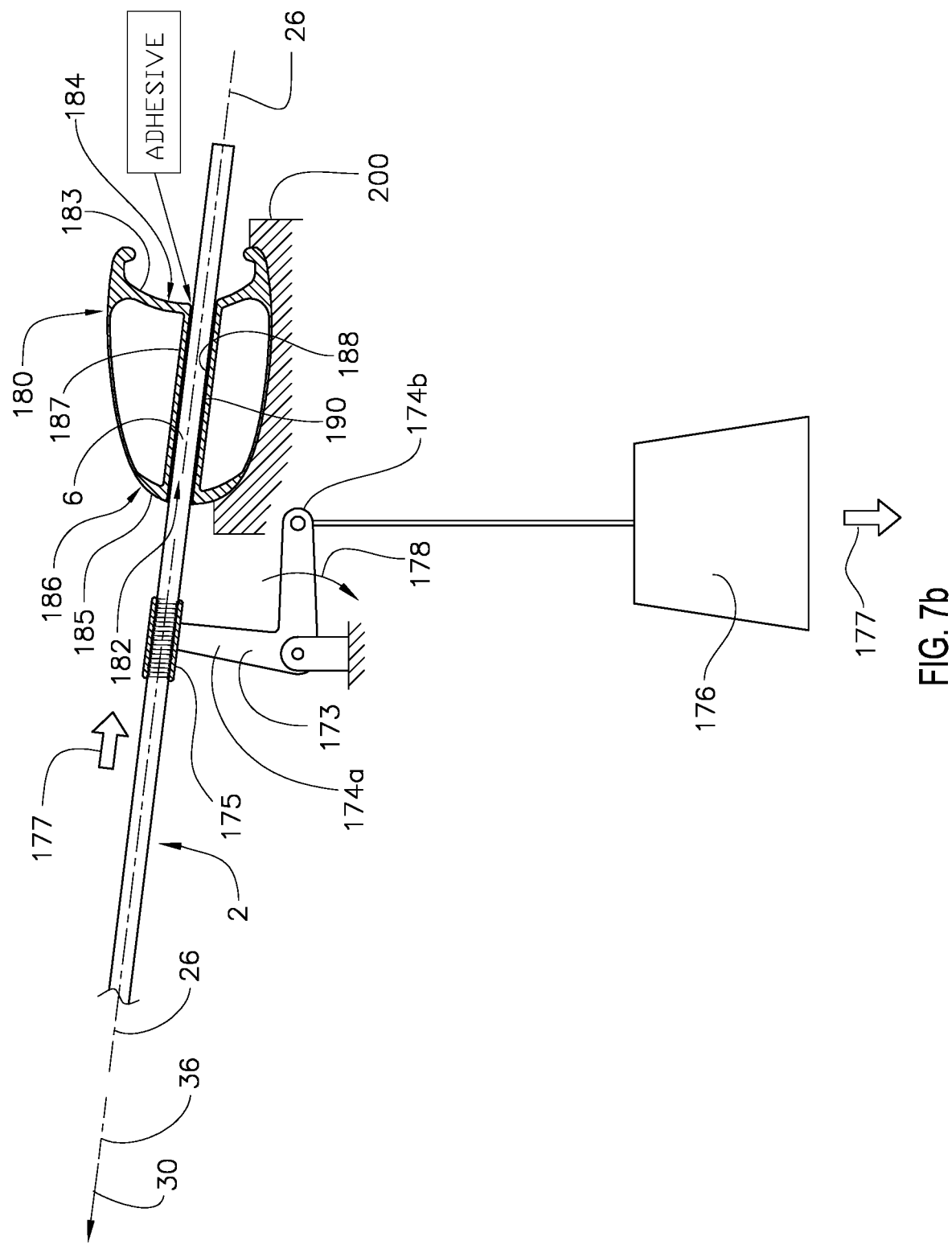

SPOKED VEHICLE WHEEL

CROSS-REFERENCE TO RELATED APPLICATION

This application claims priority of U.S. Provisional Patent Application 62/603,215 filed May 22, 2017.

This application is also a Continuation-In-Part of U.S. patent application Ser. No. 15/420,118, filed Jan. 31, 2017 and issued as U.S. Pat. No. 10,493,796.

which claims priority of Provisional Patent Application Ser. No. 62/289,389, filed Feb. 1, 2016.

which is also a Continuation-In-Part of U.S. patent application Ser. No. 15/412,151, filed Jan. 23, 2017, which is a Continuation-In-Part of U.S. patent application Ser. No. 14/641,615, filed Mar. 9, 2015 and issued as U.S. Pat. No. 9,815,321 which is a Continuation-In-Part of U.S. patent application Ser. No. 12/930,643, filed Jan. 13, 2011 and issued as U.S. Pat. No. 8,985,709, which is a Continuation-In-Part of U.S. patent application Ser. No. 12/806,064, filed Aug. 5, 2010 and issued as U.S. Pat. No. 8,657,387, which is a Continuation-In-Part of U.S. patent application Ser. No. 11/879,333, filed Jul. 17, 2007 and issued as U.S. Pat. No. 7,784,878, which is a Continuation-In-Part of U.S. patent application Ser. No. 10/755,653, filed Jan. 12, 2004 and issued as U.S. Pat. No. 7,357,460, which claims priority of U.S. provisional patent application Ser. No. 60/439,819, filed Jan. 13, 2003.

BACKGROUND

Field of the Invention

The present invention relates to a tension spoke vehicle wheel. More specifically, the present invention relates to the tensioning and assembly of the spokes of a tension spoke vehicle wheel. The present invention provides an arrangement whereby a pre-tension is applied to the spoke independently from its connection to the rim and/or hub. The present invention also provides a method for producing a vehicle wheel whereby a pre-tension is first applied to an individual spoke and the individual spoke is next connected to the rim and/or hub.

Discussion of Prior Art

Tension spoke wheels are generally configured to have a hub, an outer rim and a plurality of spokes extending between the rim and hub. The spokes are pre-tensioned or pre-stressed to provide greater strength and stiffness in use. The vast majority prior-art tension-spoke wheels, such as bicycle wheels, utilize a threadable connection between the spoke and a mating nipple to secure the spoke to the rim and/or to the hub. The end of the spoke commonly includes external threads and the nipple commonly includes internal threads and the threadable mating therebetween serves to both apply pre-tension to the spoke and to longitudinally lock and connect the spoke to the rim and/or hub.

This arrangement works well in the case of metallic spokes, since metals may be easily threaded to provide robust external (or internal) threads. However, metallic spokes tend to be heavier and lower-performing than spokes made from fiber reinforced materials, such as a polymer matrix reinforced with carbon fibers. While the fiber reinforced materials have very high tensile properties, which makes them an excellent candidate for utilization in the spokes, these materials also have lower hardness and ductility than metals. Therefore, it is difficult, if not impossible, to form threads in the end of a fiber-reinforced spoke. Therefore, in order to utilize fiber reinforced spokes, an alternate tensioning and fastening means must be developed or else the end of the fiber-reinforced spoke must be modified to include a metallic end that may be threaded.

The inclusion of a threaded metallic end on a fiber reinforced spoke is very difficult to achieve. The coupling transition between these two materials is rather difficult requires considerable expense and labor. Furthermore, this arrangement adds considerable weight to the wheel assembly, often negating any weight savings provided by the fiber-reinforced material in the first place. Still further, the coupling transition is usually large and unsightly, detracting from the aesthetics and aerodynamics of the wheel assembly.

Some wheel designers have attempted to utilize an alternative tensioning and fastening means to assemble the spokes to the rim and/or hub. Heretofore, the alternative means utilized involves a first assembly step of locking and connecting the first ends of the spokes to one of two axially spaced hub flanges and also locking and connecting the first ends of the spokes to the rim. The hub flanges are next axially spread apart in a second assembly step to impart a pre-tension to the spokes and a spacer is inserted between the flanges to maintain this pre-tension. For further description, one such an arrangement is outlined in U.S. Pat. No. 4,844,552.

Firstly, this flange spreading arrangement provides no means to control the spoke tension of an individual spoke. As such, it is difficult, if not impossible to perfectly balance the tension of the spokes to insure that the structural strength of the wheel assembly is optimized and that the wheel will rotate true and round with the minimal deviation that high performance cyclists expect.

Secondly, due to inherent variation in manufacturing, it is very difficult to calibrate and predict the exact level of spoke pre-tension that may be achieved for a given axial spread of the hub flanges. As such, the level of pre-tension is extremely difficult to optimize.

Thirdly, in an attempt to overcome the inherent challenges of this arrangement and to control the spoke pre-tension, as well as the trueness and roundness runout, the components must be fabricated and fixtured with a very high degree of precision and care, adding significantly to the tooling and labor costs involved in manufacture of the wheel assembly.

Fourthly, since all of the spokes are pre-tensioned simultaneously, and by a fixed flange distance, this flange spreading arrangement cannot accommodate variation in manufacturing, such as spoke length, fiber layup, rim/hub variations, material variation, etc. As such, the level of scrap and reject during manufacturing is invariably quite high, adding further expense.

SUMMARY OF THE INVENTION

Objects and Advantages

The present invention does not require a metallic thread connection at the spoke end, nor does it require the hub flanges to be spread to impart spoke pre-tension. Instead, the individual spoke is each initially pre-tensioned as a first assembly step and then the spoke is longitudinally locked and connected to the hub and/or rim in a second assembly step. As such, the present invention separates the means of pre-tensioning the spoke from the means of connecting the spoke to the rim and/or hub. Further, the present invention may be configured to allow that the pre-tension of each spoke be individually adjusted. Still further, the present invention is particularly adapted to the unique requirements of a fiber reinforced spoke.

Firstly, since the present invention does not require that the spoke be threadably engaged to a nipple in order to create pre-tension to the spoke. Thus, the end of the spoke need not be metallic and, if a fiber-reinforced spoke is utilized, the spoke needs no expensive and complex coupling transition to a metallic threaded component.

Secondly, since present invention allows the pre-tension of each spoke to be individually adjusted, the exact level of spoke pre-tension may be optimized for greater structural integrity of the wheel assembly. Also, the level of spoke pre-tension of the individual spokes may be evenly balanced, thereby further increasing the structural integrity of the wheel assembly. Further, the runout of trueness and roundness during rotation of the wheel assembly may be precisely tuned to achieve very low deviation.

Thirdly, the present invention does not require excessive manufacturing precision and/or excessive labor skill and/or excessively precise and elaborate fixturing. This saves significant manufacturing expense in comparison with the aforementioned flange-spreading pre-tensioning method.

BRIEF DESCRIPTION OF THE DRAWINGS

The present invention will be more readily understandable from a consideration of the accompanying exemplificative drawings, wherein:

FIG. 2b is a cross-section view of the prior art bicycle wheel as seen generally in the direction 15-15 of FIG. 2a;

FIG. 3b is a partial cross-section view of the bicycle wheel of FIG. 3a as seen generally in the direction 20-20 of FIG. 3a;

FIG. 4b is a partial exploded view showing the connector, the jack assembly, the anchor sleeve, and the spoke prior to pre-assembly and tensioning of the spoke and corresponding to the view of FIG. 4a;

FIG. 4c is a partial view showing the connector, the jack assembly, the anchor sleeve, and the spoke as next pre-assembled, prior to tensioning of the spoke;

FIG. 4d shows the anchor sleeve as next crimped and connected to the spoke;

FIG. 4e shows the spoke as next pre-tensioned by means of the jack assembly;

FIG. 4f shows the connector as next crimped and connected to the spoke while the spoke is in the pre-tensioned state;

FIG. 4g shows the anchor sleeve, jack assembly, and excess spoke portion as next severed and removed from the spoke. The spoke is now connected to the rim as shown in FIG. 3a;

FIG. 7b is a partial cross section view of a fifth embodiment of the present invention in an assembly sequence corresponding to FIG. 4f, where adhesive is utilized to create a joining interface between the spoke and the rim and where spoke pre-tension is created by means of a bell crank and dangling weight connected to a portion of the spoke that is within the span portion.

DETAILED DESCRIPTION OF THE INVENTION

Figure 1:
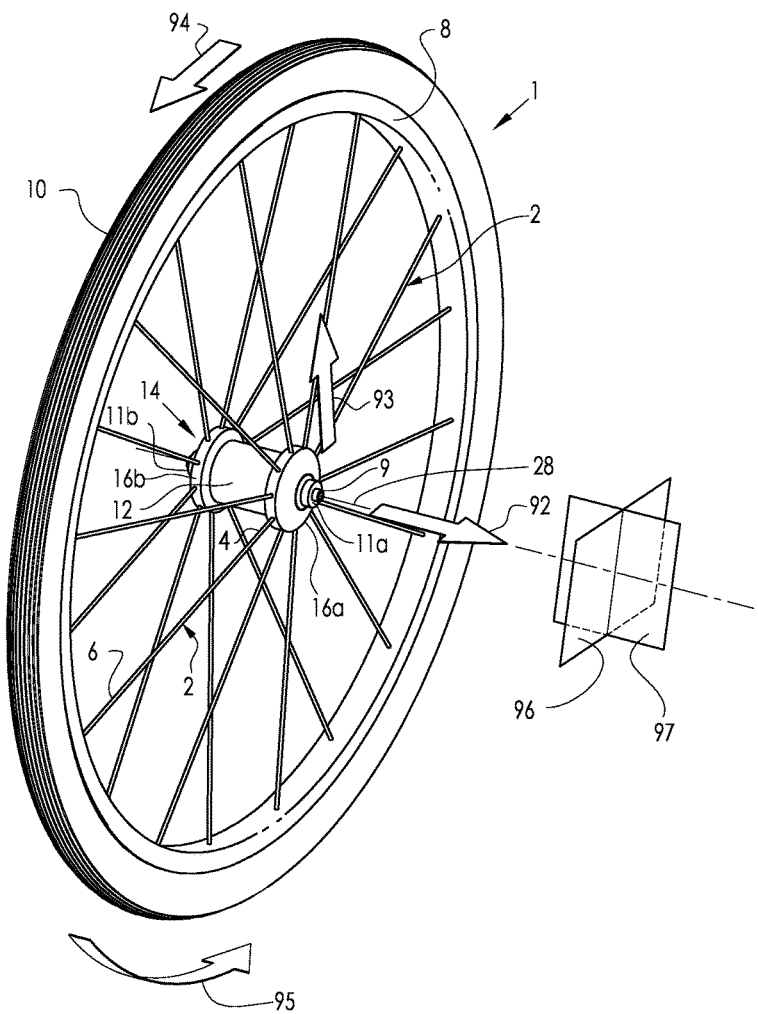
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16a and 16b, each of which include a means for connecting with a multiplicity of spokes 2 connected thereto. Axle 9 includes end faces 11a and 11b that define the spacing of its mounting with the frame (not shown). The axial axis 28 is the axial centerline of rotation of the bicycle wheel 1. The hub flanges 16a and 16b may be contiguous with the hub shell 14 or may be separately formed and assembled to the hub body 12 portion of the hub shell 14. Each spoke 2 is affixed to its respective hub flange 16a or 16b at its first end 4 and extend to attach the rim 8 at its second ends 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b. While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pretensioned during assembly to create a pretensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral or side-to-side loads, only a single hub flange may be employed.

Figure 2A:
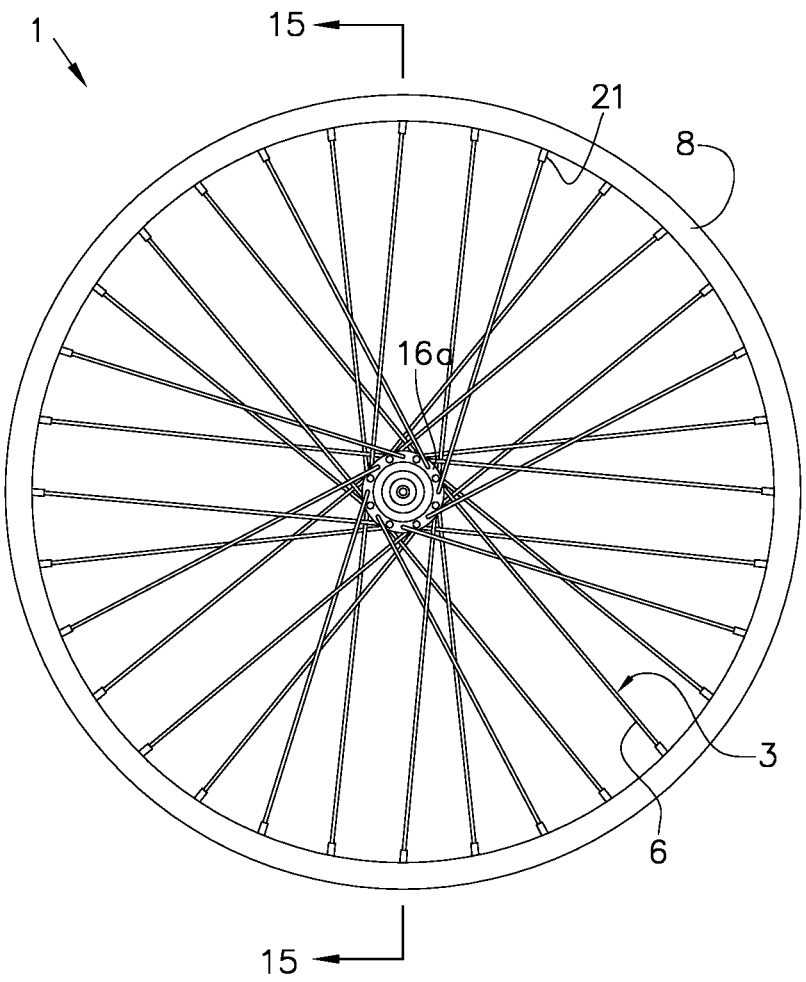
FIG. 2a is an axial plan view illustrating a prior art bicycle wheel.
Figure 2B:
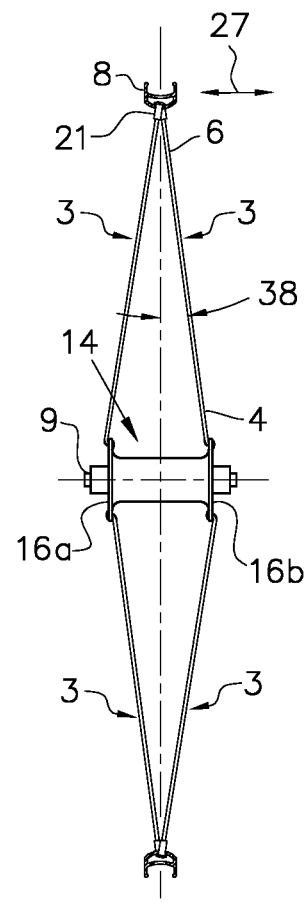
Figure 2C:
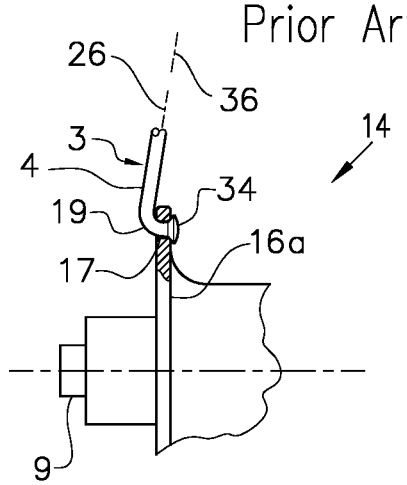
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 3. The hub shell 14 is rotatable about the axle 9 and includes a pair of axially spaced hub flanges 16a and 16b. The wheel is assembled by first threading each individual spoke 3 through an axial hole 17 in the hub flange 16 until the j-bend 19 of the first end 4 is hooked within the hole 17. The spoke 3 is then pivoted to extend in a generally radial direction toward the rim 8. The enlarged portion 34 or "head" of the spoke 3 prevents the spoke 3 from pulling through the hole 17 in the hub flange 16a. The second end 6 of each spoke 3 is then fixed to the rim 8 via spoke nipples 21. The span of the spoke 3 is defined herein as the portion of the spoke 3 that spans between its connection to the hub flange (16a or 16b) at its first end 4 and its connection to the rim 8 at its second end 6 and the span length refers to the longitudinal length of the span. Tightening the threaded engagement between the spoke nipple 21 and the spoke 3 serves to effectively shorten the span length of the spoke 3. Thus, as the nipples 21 are threadably tightened, the spokes 3 are drawn up tight and a degree of pre-tension is induced in each spoke 3. By selectively adjusting this threaded engagement, the spoke pre-tension may be adjusted and balanced relative to the other spokes 3 and to also align the trueness and roundness of the rim 8. The spoke pre-tension is resisted by circumferential compression of the rim 8 and it is this balance of forces that imparts efficient structural integrity to the bicycle wheel 1. Also shown in FIG. 2b, there is bracing angle 38 between the radial centerline plane of the rim 8 and the tensile axis 36 of the spokes 3. As this bracing angle 38 is increased, the lateral or side-to-side stiffness (i.e. stiffness in the axial direction 92) of the wheel 1 is also increased.

It is noted that the threadable connection between the nipple 21 and its mating spoke 3 serves both as a pre-tensioning means and as a means to lock the second end 6 of the spoke 3 to the rim 8 during use of the bicycle wheel. This pre-tensioning means occurs within the spoke itself since the engagement interface (i.e. the threadable engagement) serves to both induce the pre-tension in the spoke and to maintain this pre-tension during operation of the wheel 1. This requires that this threadable connection be robust enough to perform both of these functions and that the threadable engagement must operate smoothly and consistently. As such, both the spoke 3 and the nipple 21 are preferably metallic materials with sufficient strength and hardness to achieve a smooth and consistent threadable adjustment as well as having a high degree of structural strength of the threadable engagement. However, these metallic materials are generally heavy in comparison with fiber reinforced spoke materials. Further, if one attempts to incorporate such metallic threads with a fiber reinforced spoke, this is difficult to achieve and adds complexity and cost to the fiber reinforced spoke while also increasing weight.

It is further noted that in a tension spoke wheel 1, the pre-tension of the spokes 3 induce a longitudinal tensile strain and stretch in the corresponding spokes, as well as a circumferential hoop compression strain of the rim 8. There may also be a strain of the hub assembly 14, however such strains are commonly quite small in comparison to strain of the spoke 3 and/or rim 8. In order for the wheel 1 to effectively support cycling loads, it is important to carefully balance this spoke pre-tension so that the cycling loads are evenly distributed throughout the wheel 1 and so that the wheel rim 8 rotates round and true. It is usually preferable that these strains be within the elastic limit of the corresponding spoke 3 and/or rim 8. This is commonly achieved by adjusting the length of the spoke span to induce strain in the wheel and then locking the spoke connections at its first end 4 and second end 6 to fix the length of the spoke span therebetween and maintain the pre-tension in the spokes 3 while the wheel 1 is in its free-state (i.e. prior to loading the wheel in use).

The present invention will illustrate an exemplary arrangement whereby the spoke may be initially pre-tensioned by a means external to the spoke connection and then, in a second step, the spoke is locked or otherwise engaged to the bracing element (i.e. the rim and/or hub) to maintain the pre-tension of the spoke in the assembled wheel. In other words, the means to pre-tension the spoke is segregated from the means to connect the spoke to create the assembled wheel. Further, the means to pre-tension the spoke may also be external to the spoke itself and may be removed from the spoke prior to operation of the wheel assembly. In this arrangement, the engagement interface that connects the spoke to the bracing element needs only to maintain the spoke pre-tension, it does not need to create this pre-tension. This type of engagement interface more readily lends itself to interface with a spoke of fiber-reinforced material and thus permits and facilitates the utilization of such a spoke in the wheel assembly.

Figure 3A:
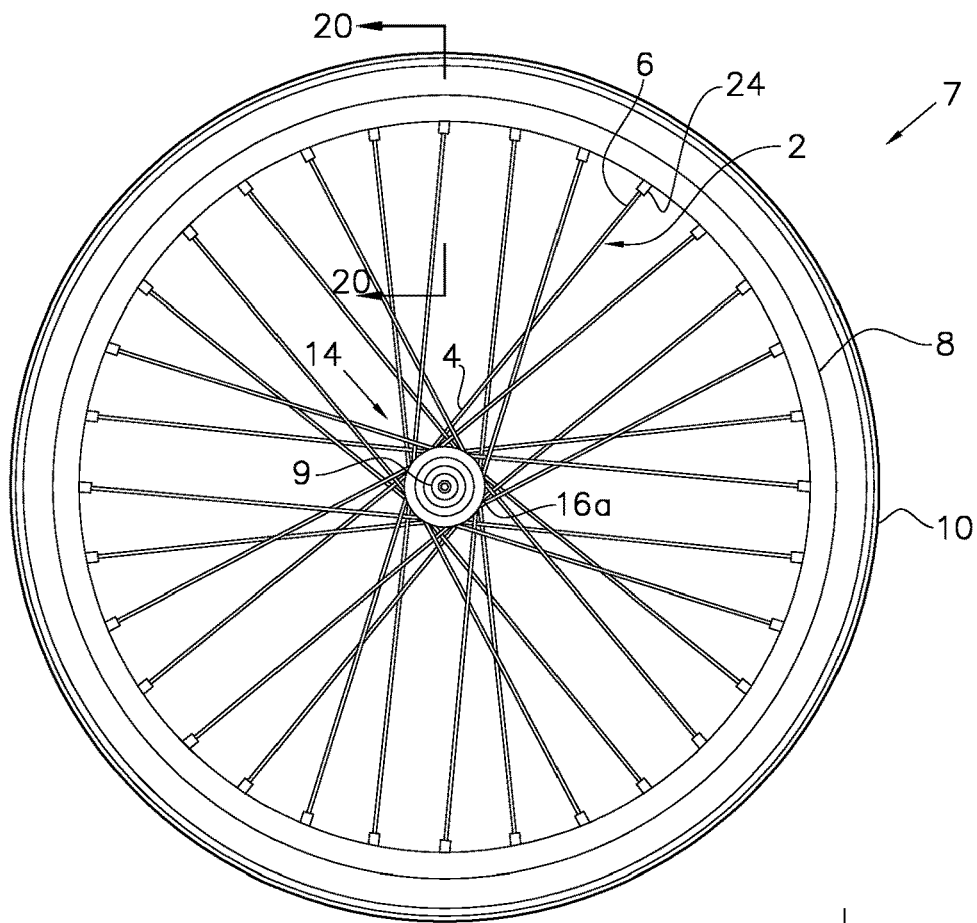
FIG. 3a is a plan view of a first embodiment of the present invention, illustrating an assembled bicycle wheel including a connector connected to each spoke, with each connector serving as a termination for the corresponding spoke.
Figure 3B:
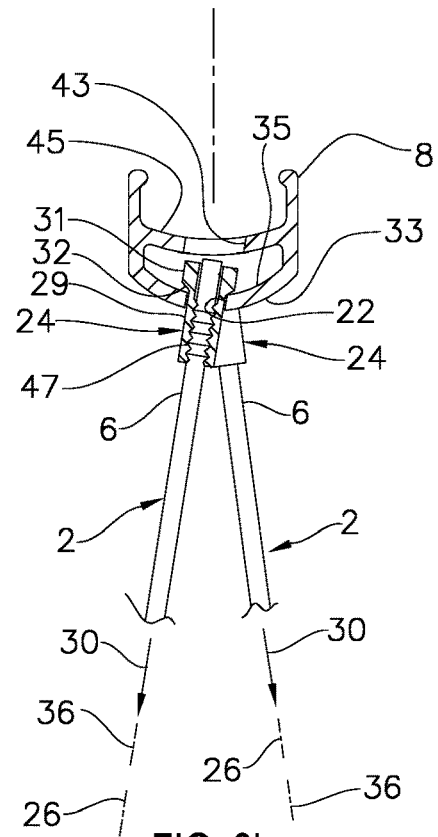

FIGS. 3a and 3b show an exemplary bicycle wheel 7 that corresponds to the embodiment of FIGS. 4a-g and also schematically describes the other embodiments of the present invention as well. This figure is shown to provide a generic assembly to illustrate an arrangement wherein the present invention may be adapted to utilization in bicycle wheel construction. The bicycle wheel 7 includes spokes 2, hub 14, rim 8, and tire 10. The hub 14 includes hub flanges 16a and 16b (obscured) and axle 9. The rim 8 includes geometry for mounting of a tire 10 and a multiplicity of spoke holes 22 in its spoke bed wall 33, each to accept an individual connector 24. It is noted that the rim 8 and hub flanges 16a and 16b are shown here is an exemplary representations of a bracing element that may serve as a rim or a hub flange and may take on a wide range of forms. The spokes 2 are preferably constructed of fiber-reinforced material and are connected at their first end 4 to their associated hub flange 16a or 16b and at their second end 6 to the rim 8.

The spoke 2 is a generally long slender tensile element with a longitudinal axis 26 along its length and generally parallel to its sidewalls. The spoke 2 also has a tensile axis 36 of applied tensile load 30 that extends along the span portion of the spoke 2 between its anchor points at the rim 8 and hub flange 16. The tensile axis 36 is generally collinear to the longitudinal axis 26, except where the spoke 2 is bent to deviate from the tensile axis 36. For the purposes of definition, as relating to spokes 2 and connections thereto, the term "longitudinal" herein refers to alignment along the longitudinal axis 26. A longitudinally inboard (or inward) orientation refers to an orientation proximal the midpoint of the span portion. Conversely, a longitudinally outboard (or outward) orientation refers to an orientation distal the midpoint of the span portion. The term "lateral" refers to alignment in a direction generally perpendicular to the longitudinal axis 26. A laterally inboard (or inward) orientation refers to an orientation proximal the longitudinal axis. Conversely, a laterally outboard (or outward) orientation refers to an orientation distal the longitudinal axis.

To create a solid connection between the spoke 2 and the rim 8, the second end 6 of each fiber reinforced spoke 2 is first connected to a corresponding connector 24 by means of a crimped connection at an engagement interface 25 as described herein. The connector 24 is crimped to the second end 6 of the spoke 2 as described in FIG. 4f. The connector 24 includes a shank portion 29, a head portion 31, and a transition surface 32 therebetween as shown in FIG. 3b, which is a detail view of the embodiment described in FIG. 3a and shows the rim 8 in cross-section. As shown in FIG. 3b, shank portion 29 extends through spoke hole 22, with transition surface 32 serving as an engagement surface to bear against the radially outboard surface 35 of the spoke bed wall 33 in an overlie engagement, which provides blocking engagement to resist and maintain spoke tension 30. It should be noted that the transition surface 32 provides engagement geometry to engage the connector 24 to the bracing element (rim 8).

The connector 24 of FIGS. 3a-b is generally shown to serve as a termination to the spoke 2 and provide means to connect or anchor the spoke to a bracing element (i.e. rim 8). Note that the span of spoke 2 extends between its anchor points at the hub flanges 16a or 16b and the rim 8 and is aligned along the tensile axis 36 in the direction of spoke tension 30, which is collinear with the longitudinal axis 26. FIG. 3a shows that the full complement of spokes 2 of the wheel 7 are terminated at the rim 8 in this manner. The connector 24 may alternatively be connected to the first end 4 of the spoke 2 for connection to the hub flanges 16a or 16b. For simplicity in describing this embodiment a rim 8 connection arrangement is shown herein, with the understanding that such an embodiment may be easily adapted to hub connections as well. It is understood that FIGS. 3a-b correspond to a simplified representative arrangement for illustration purposes. Several of the embodiments of the present invention may be applied to the schematic configuration of this arrangement.

The present invention comprises a spoke 2, which may be considered as a longitudinal tensile element having an end portion and a cross-section thereof, a connecting element, a bracing element, and a tensile axis 36 of applied tensile load 30 along the longitudinal tensile element. In the embodiment of FIGS. 3a-b and 4a-g, the longitudinal tensile element is connected to the connecting element by means of a crimped joinder between the longitudinal tensile element and the connecting element. In all of the embodiments shown herein, the longitudinal tensile element is a vehicle wheel spoke 2, the hub assembly 14 constitutes a first bracing element and the outer rim 8 constitutes a second bracing element.

A spoke 2 is a generally long slender element, with a length greater than its cross sectional width, and with a longitudinal axis extending generally along its length. The longitudinal tensile element (i.e. spoke) includes external sidewall surface(s) that extend generally along its length. As such, the longitudinal axis 26 is generally parallel to the sidewall surface. The tensile axis 36 is the axis along which tensile loads 30 are applied to the tensile element, and is commonly collinear with the longitudinal axis 26, particularly in the region of the structural span of the longitudinal tensile element. For the purposes of explanation herein, the term "longitudinal axis" is generally interchangeable with the term "tensile axis" unless otherwise noted. Some examples of a longitudinal tensile element include the spoke of a vehicle wheel, a guy wire, a control cable, or a tendon. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The span portion of the spoke is considered as the portion of the spoke that is under tension and that extends between its anchor points and/or engagements at the bracing elements (i.e. hub and rim). A location outboard of the spoke span is a location along the tensile axis 36 and/or longitudinal axis 26 that is beyond or external to the span portion.

The spoke has longitudinal external sidewall surface(s) that may be generally parallel to the longitudinal axis and an end face that is generally perpendicular to the sidewall surface. With a slender spoke, the sidewall tends to have far greater available surface area than its end face. Since an engagement interface of greater surface area tends to provide a more robust connection, it is often preferable to provide an engagement interface that extends longitudinally along the sidewall surface and preferably by a longitudinal length at least twice the cross sectional thickness of the spoke. This is in contrast to conventional spoke arrangements that focus these loads on a small point of contact, as with conventional prior art wheel assemblies.

It may be termed that a longitudinal engagement is an engagement that includes a continuous longitudinal engagement interface or an engagement that includes at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the interface surface area and will therefore increase the load carrying capacity of the crimped joinder between the connector and the spoke.

Since a longitudinal engagement may reduce the contact stresses at the engagement interface where the connector and the spoke are joined, this type of engagement is particularly applicable to bracing elements and/or spokes of polymer or reinforced polymer materials. This is particularly advantageous, since these materials tend to have high strength and light weight. However, heretofore these materials have been difficult to apply to conventional spoke connection systems that are generally focused on construction based on metallic materials. While the spokes described in the present invention may be constructed from a variety of materials, including a wide range of metallic materials and polymeric materials, one particularly advantageous aspect of the present invention is its ability to provide a termination means for a spoke of fiber reinforced polymer material.

In order to take advantage of the lightweight and high strength of the high-performance fibers mentioned hereinabove, it may be preferable to incorporate these material(s) in the spoke. These materials tend to be anisotropic and have greater strength along the direction of the fiber. Thus it may be preferable that these fibers are aligned to be parallel to the tensile axis. It is also preferable that these reinforcement fibers be encapsulated in a matrix. While short or discontinuous fibers often provide significant reinforcement to the matrix material, it is preferable that the fibers be as long as possible to provide the greatest overlap with adjacent fibers. The utilization of continuous fibers that extend generally along the length of the spoke provides the highest mechanical properties.

A spoke of high strength fibers in a resin matrix has numerous advantages in the present invention. Firstly, the resin matrix adheres the adjacent fibers to each other so that, through a joinder to the external surface of the spoke, the overmolded interface has a connection with all of the fibers of the spoke, which permits the fibers to work together for optimal tensile properties. Further, the resin matrix coats the outside of the pre-formed spoke, which creates an optimal surface for joinder with the connector at the engagement interface.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored between two bracing elements and the tensile element thereby serves to connect the two bracing elements to each other. In an example where the tensile element is generally held in tension, such as the spoke of a tension-spoke vehicle wheel, a first bracing element may be the hub flange and a second bracing element may be the outer rim hoop. Similarly, in the case where the tensile element is generally held in compression, such as the spoke of a compression-spoke vehicle wheel, the bracing element is that element which the tensile element is pushed against.

In the descriptions provided herein, the term "coupling" identifies an arrangement where a connecting element serves to provide a structural connection between two tensile elements (i.e. spokes), thus permitting tensile loads to be transmitted from one tensile element to another. A coupling may be considered to provide a connection within the span portion of the spoke or to couple together two spoke portions. In contrast, the term "termination" or "anchor" identifies a connecting element that serves to provide a means to connect the tensile element (i.e. spoke) at the terminus of its span, either directly or indirectly, to a bracing element (i.e. the hub or rim), to which the tensile element is intended to be anchored.

FIGS. 4*a*-*g* describes the means by which an individual spoke 2 of FIGS. 3*a*-*b* may be first operated upon to be pre-tensioned and then connectedly fixed to the bracing element (in this case the rim 8) to lock and maintain this pre-tension 30 during the use and operation of the wheel 7. It is preferable that the pre-tensioning of this individual spoke 2 may be performed independently of another spoke 2 of the wheel 7.

Figure 4A:
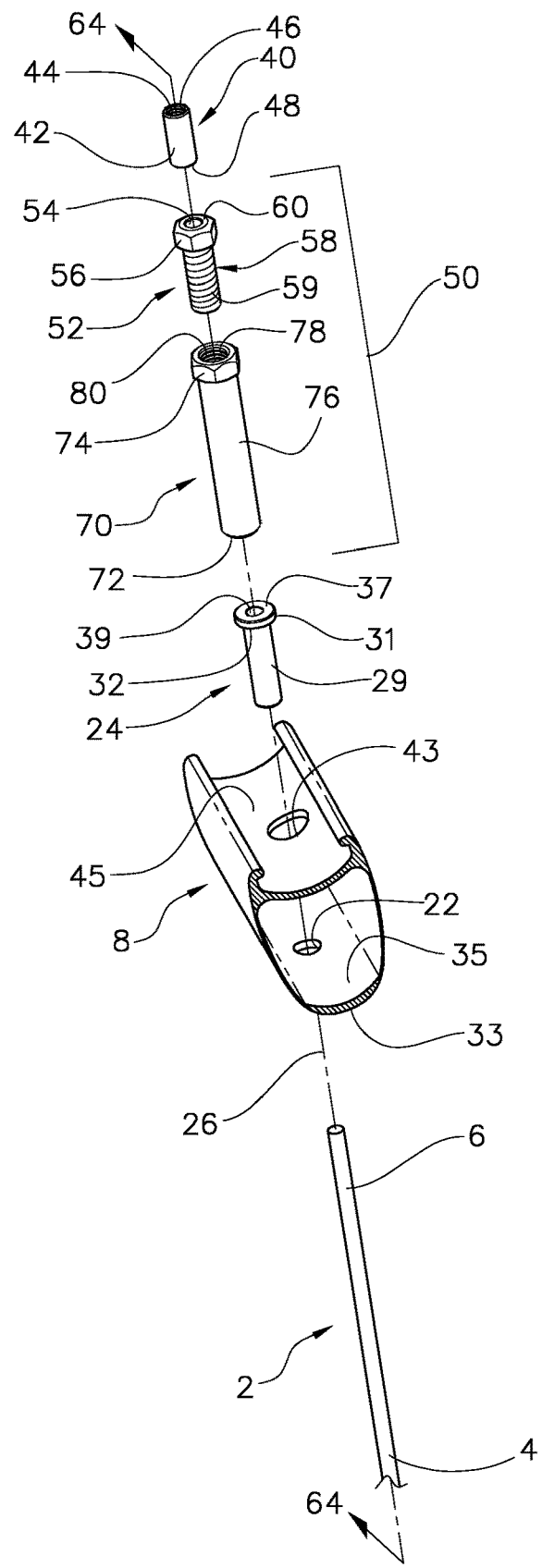
FIG. 4a is a partial exploded perspective view of the embodiment of FIG. 3a, showing the connector, the jack assembly, the anchor sleeve, and the spoke prior to pre-assembly and tensioning of the spoke.
Figure 4B:
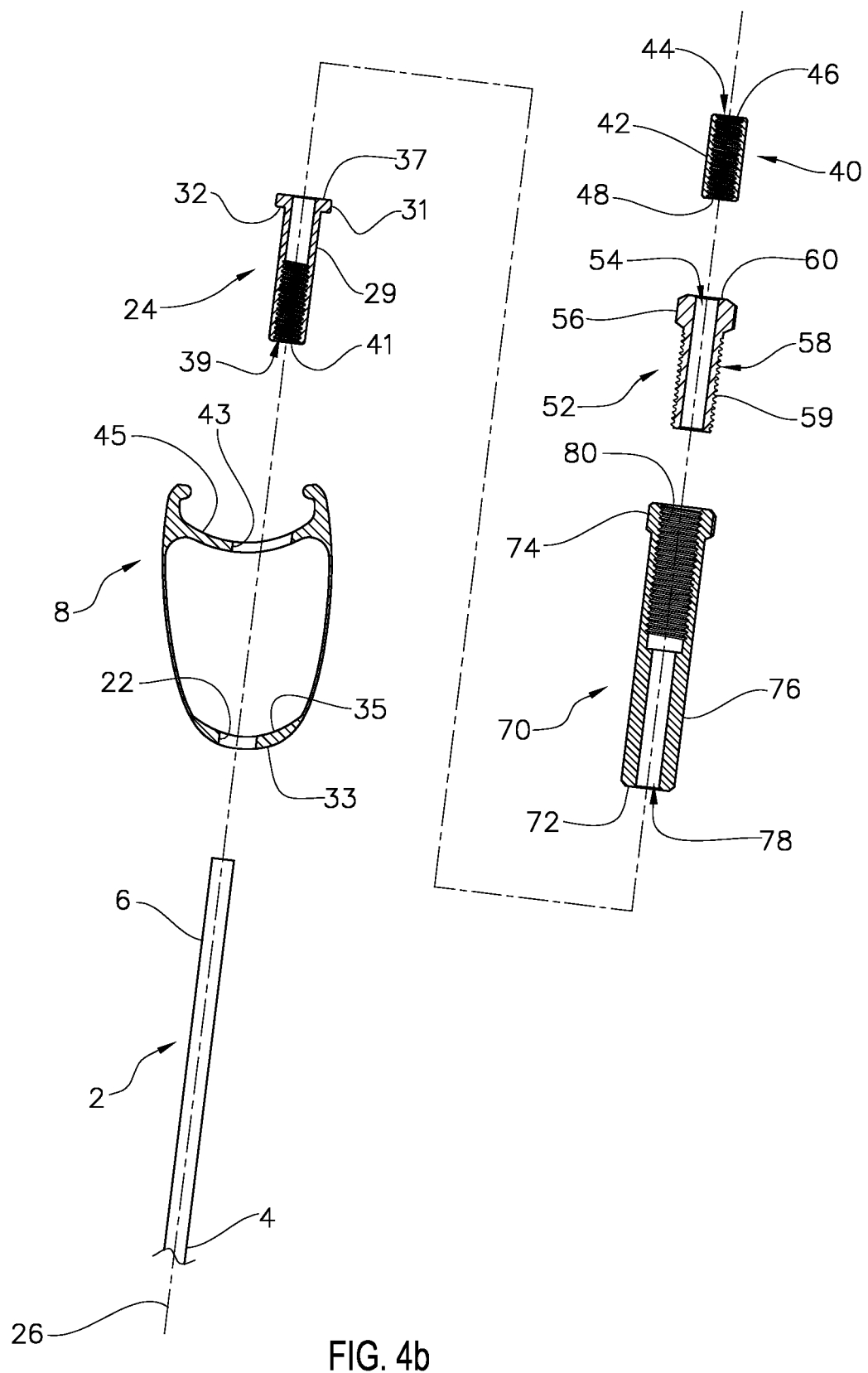
FIGS. 4b-g are cross section views, taken along 64-64, of the embodiment of FIG. 4a showing the successive assembly sequence involved in tensioning and connecting the spoke to the rim.

FIGS. 4*a*-*b* show the components involved in exploded view prior to their assembly and prior to pre-tensioning and fixing the spoke 2 to the rim 8. Spoke 2 is a longitudinal element that extends along a longitudinal axis 26 and includes a first end 4 for connection to the hub (not shown) and a second end 6 for connection to the rim 8. Rim 8 is of conventional configuration and includes a spoke bed wall 33 with a radially outboard surface 35 and a plurality of spoke holes 22 therethrough, a tire bed wall 45 with a plurality of access holes 43 aligned with corresponding spoke holes 22.

Rim 8 is identical to that described in FIGS. 3*a*-*b* and includes a tire bed wall 45 with a spoke access hole 43 therethrough that is preferably longitudinally aligned with spoke hole 22. As known in industry, it may be preferable that the rim 8 be made of a strong and lightweight material such as aluminum or magnesium or else made of a fiber reinforced material such as carbon fibers in a resin matrix.

The connector 24 includes a shank portion 29, an enlarged head portion 31, an end face 37, and a transition surface 32. Connector 24 also includes a hole 39 extending longitudinally therethrough with internal threads 41 on its interior surface. Internal threads 41 serve to provide a configured internal surface of the hole 39 consisting of a corresponding radially inwardly projecting helical thread rib. It may be preferable that the connector 24 be made of aluminum or another yieldable and ductile material to facilitate crimping as described in FIG. 4*f*.

Jack assembly 50 includes the collar 52 and sleeve 70. Sleeve 70 includes end face 72, shank portion 76, and flats 74 in a hex configuration as shown for manual manipulation with a wrench (not shown). Sleeve 70 also includes a hole 78 extending longitudinally therethrough with internal threads 80 on its interior surface. Collar 52 includes end face 60, shank portion 58 with external threads 59, and flats 56 in a hex configuration as shown for manual manipulation with a wrench (not shown). Collar 52 also includes hole 54 extending longitudinally therethrough. External threads 59 are configured for threadable engagement and mating assembly with internal threads 80. Anchor sleeve 40 includes an end face 48, an external surface 42, and a hole 44 extending longitudinally therethrough with internal threads 46 on its interior surface. Internal threads 46 serve to provide a configured internal surface of the hole 44 consisting of a corresponding radially inwardly projecting helical thread rib.

Figure 4C:
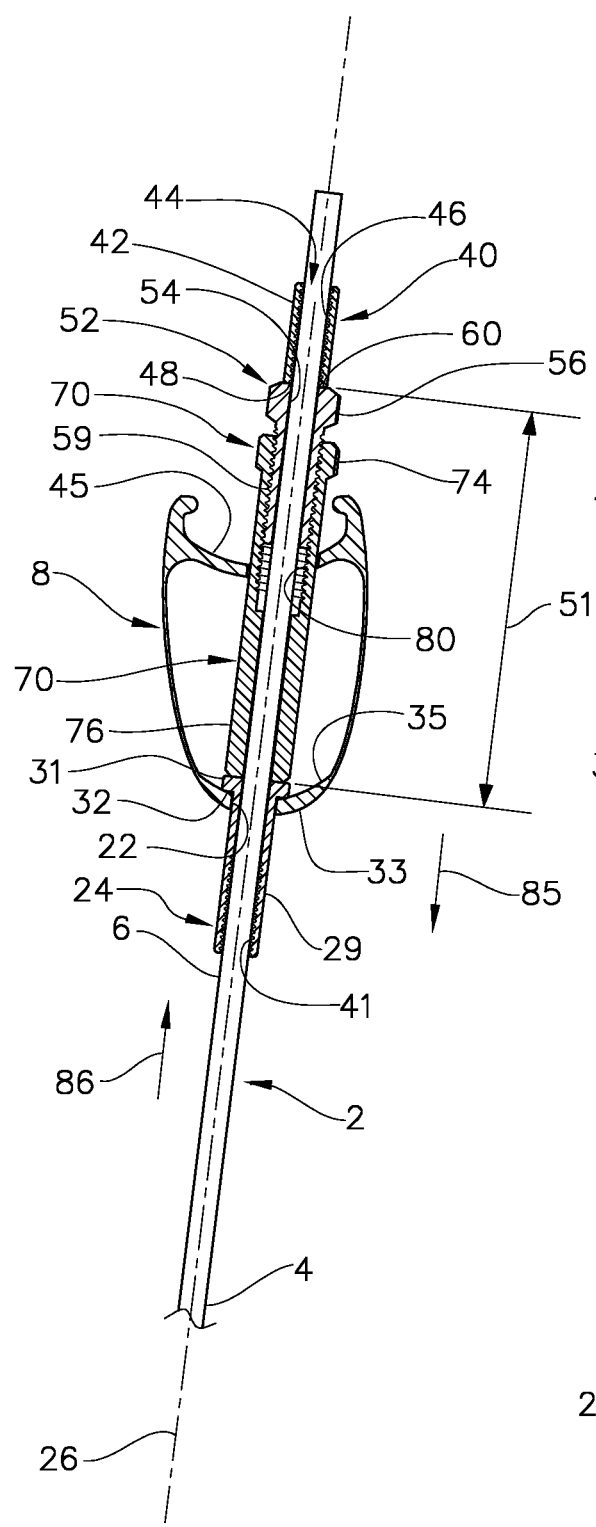

FIG. 4*c* shows the components of FIGS. 4*a*-*b* as loosely preassembled together. Connector 24 is assembled to the rim 8 with shank portion 29 extending through the spoke hole 22 in direction 85 until transition surface 32 abuts the outboard surface 35 of spoke bed wall 33. Collar 52 is threadably pre-assembled to sleeve 70 with internal threads 80 threadably engaged to external threads 59 to achieve a generally collapsed longitudinal jack dimension 51 between end faces 72 and 60. Second end 6 of spoke 2 is passed in direction 86 through hole 39, hole 78, and opening 54 to extend longitudinally outwardly from end face 60. Anchor sleeve 40 is assembled in direction 85 such that the spoke 2 extends through hole 44. The components are axially stacked such that end face 72 is abutting end face 37 and end face 48 is abutting end face 60.

Figure 4D:
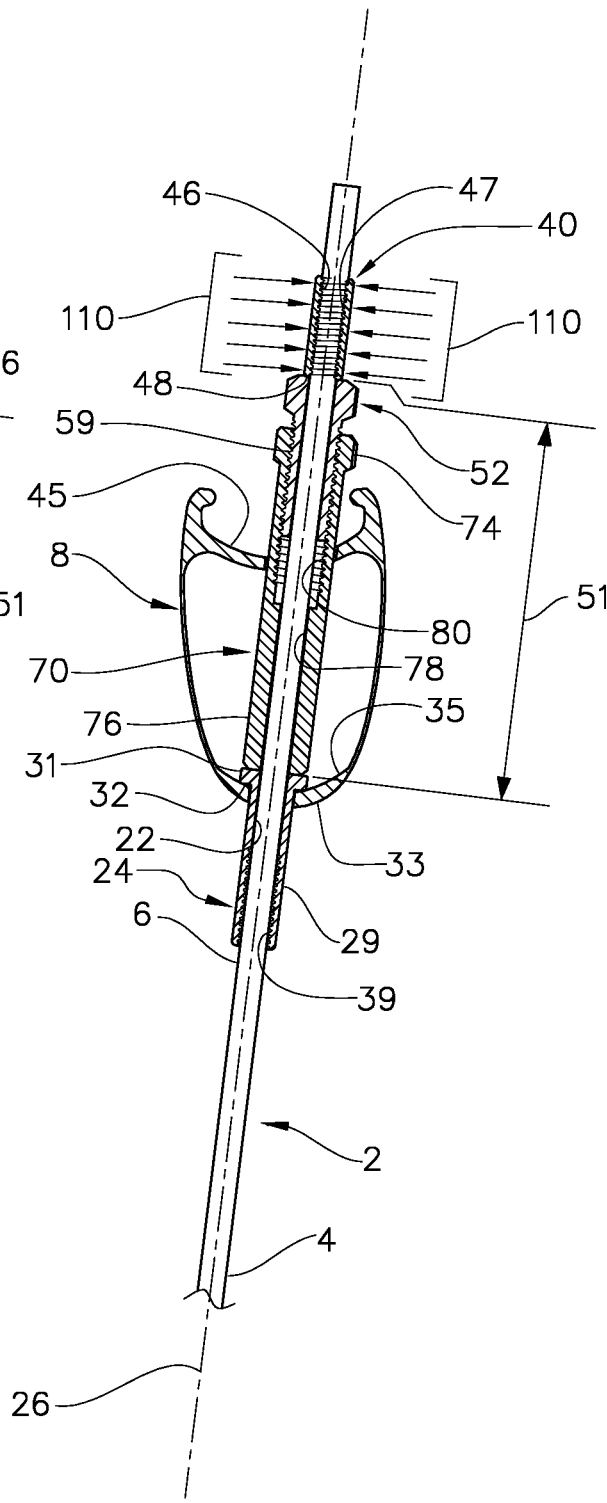

Next, as shown in FIG. 4*d*, anchor sleeve 40 is laterally crimped with crimp force 110 applied to press laterally inwardly against external surface 42. This crimp force 110 serves to plastically deform the anchor sleeve 40 and to correspondingly laterally shrink and/or collapse the hole 44 such that the internal threads 46 grip and bite into the external surface of the spoke 2, thus firmly connecting and longitudinally locking the anchor sleeve 40 to the second end 6 at engagement interface 47. It is understood that each spoke 2 of the wheel 7 includes its own respective individual connector 24, jack assembly 50, and anchor sleeve 40 assembled in an identical manner to that described in FIG. 4*d*. It is understood that, while a deformably crimped engagement is shown here as a representative means to secure, connect, and/or join the anchor sleeve 40 to the spoke 2. A wide range of alternate means may be utilized to secure the anchor sleeve 40 to the spoke 2, such as an adhesive joinder, a welded joinder, a mechanically fastened connection, etc. Further, the spoke may be directly deformed or headed, or any other means to connect the jack assembly 50 to the spoke 2.

Figure 4E:
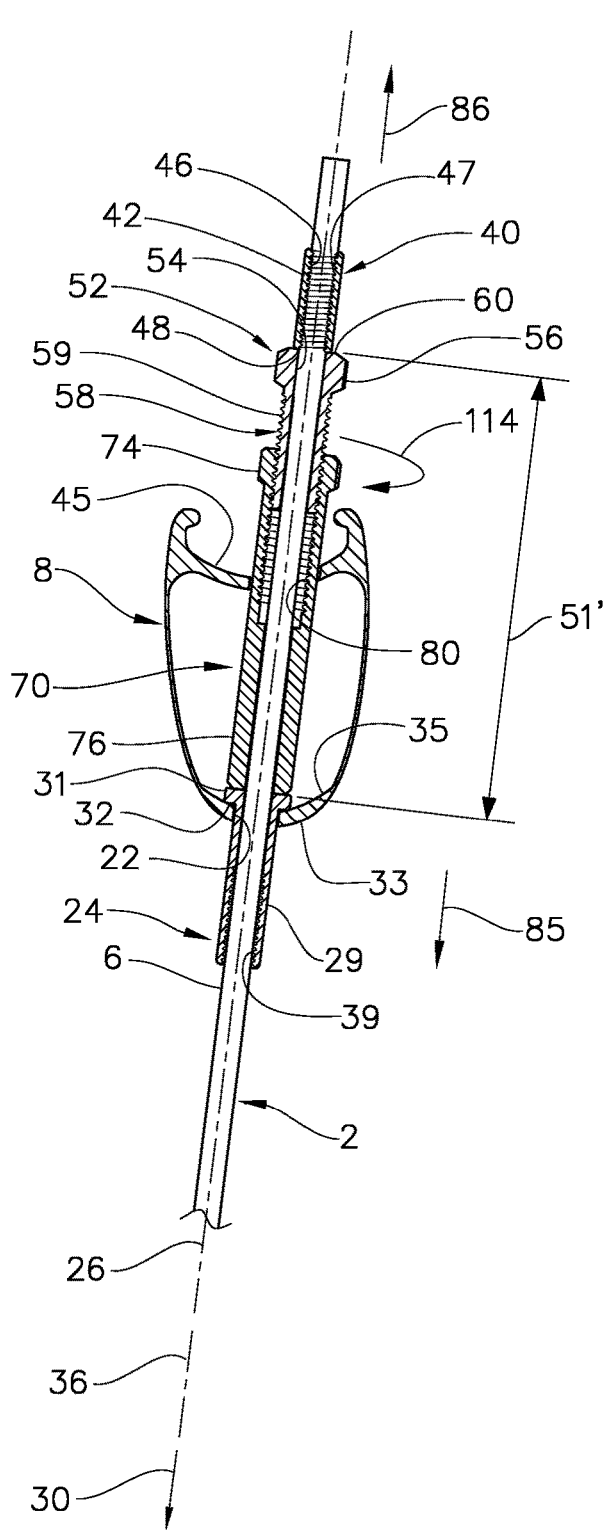

Next, as shown in FIG. 4*e*, the sleeve 70 is unthreaded from the collar 52 in direction 114 at the threadable assembly between internal threads 80 and external threads 59 to drive the end face 60 longitudinally outwardly in direction 86 and to drive the end face 72 longitudinally inwardly in direction 85 to a longitudinally expanded extended jack dimension 51'. This is achieved by means of manually rotating the sleeve 70 relative to the collar 52 by means of wrenches (not shown) engaged to their respective flats 74 and 56. This causes the end face 60 to forcibly bear against the end face 48 and to draw the second end 6 through the hole 36 thereby stretching and straining the spoke to pre-tension the spoke 2 to the desired degree of pre-tension 30. There is lateral clearance between the second end 6 and the hole 39 so that the second end easily slips and is drawn through through hole 39 as it is longitudinally displaced relative to the connector 24 during this pre-tensioning procedure. This tensioning process is repeated for the other spokes of the wheel 7 and then the pre-tension 30 of each of the spokes 2 are finely balanced and tuned in a manner similar to the pre-tension of conventional wheels (such as by means of threadable adjustment between spoke 2 and nipple 21 of FIGS. 2*a*-*c*) in order to achieve the desired level of spoke pre-tension 30 and to insure that the rim 8 spins true and round. Thus it may be seen that the pre-tension of each individual spoke 2 may be independently adjusted to easily and precisely control its pre-tension 30.

It is noted that manipulating the threadable assembly between sleeve 70 and collar 52 serves to provide a controlled positive longitudinal displacement of the anchor sleeve 40. It is also noted that one end of the jack assembly 50 bears against the connector 24, which bears on the rim 8, while its opposite end bears against the anchor sleeve 40, which carries the second end 6 of the spoke 2. Such an arrangement serves to induce and to accommodate and compensate for strain in both the spoke 2 and the rim 8 during this pre-tensioning process. As such, the jack assembly 50 may be viewed as a jack or a means to spread the longitudinal orientation between the spoke 2 and the rim 8.

Figure 4F:
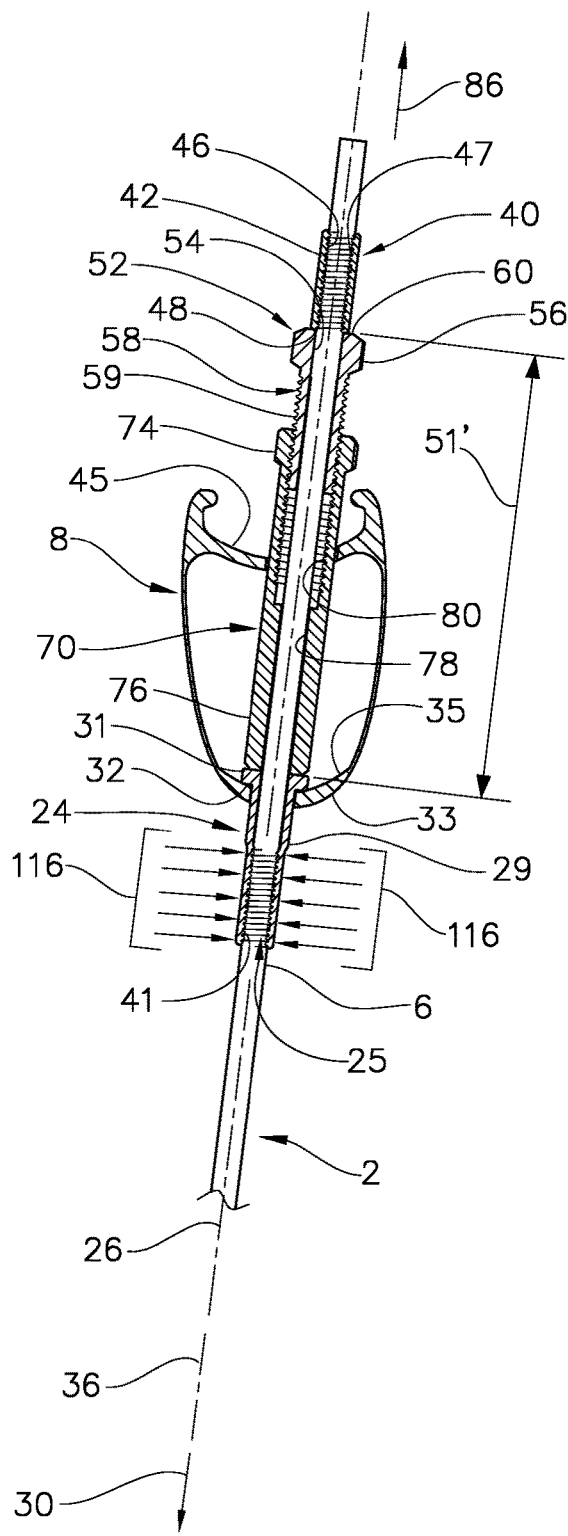

Next, as shown in FIG. 4*f*, the exposed portion of the shank portion 29, which laterally overlaps the second end 6, is laterally crimped with crimp force 116 applied thereto to press laterally inwardly against shank portion 29. This crimp force 116 serves to plastically deform this portion of the shank portion 29 and to corresponding laterally shrink and/or collapse the hole 39 such that the internal threads 41 grip and bite into the external surface of the spoke 2 end, resulting in an engagement interface 25 to firmly connect and longitudinally lock the connector 24 to the second end 6 of the spoke 2. This crimping process is next repeated to crimp and longitudinally lock and connect the remainder of the spokes 2 of the wheel 7. The second end 6 of the spoke 2 is now firmly engaged to the rim 8 (by means of connector 24) and the span length of the spoke 2 is thus correspondingly fixed, locked, and maintained. Thus, the engagement interface 25 and the connection between the spoke 2 and the rim 8 is selectively activated after the spoke 2 has already been pre-tensioned in a two-step process.

It is further noted that the pre-tension of the spoke 2 provided by the jack assembly 50 is longitudinally offset from, and completely externally to, the engagement interface 25 that secures the spoke 2 to the rim 8 (by means of connector 24). This is in contrast to the conventional prior-art arrangement illustrated in FIGS. 2a-c where the threaded engagement between the spoke 3 and nipple 21 serves to both provide pre-tension to the spoke 3 and to secure it to the rim 8 such that the tensioning means and the connection interface occur within the same interface.

It is also noted that the engagement interface 25 is a longitudinal engagement interface resulting in a longitudinal engagement between the second end 6 and the connector 24 as defined hereinabove. This longitudinal engagement is particularly advantageous for fiber-reinforced spokes. Furthermore, unlike the threadable assembly between the spoke 3 and nipple 21 of FIGS. 2a-c, this longitudinal engagement does not apply a torque to the spoke 2, which could otherwise damage a fiber-reinforced spoke. As such, the present invention is particularly advantageous when applied to fiber-reinforced spokes.

Figure 4G:
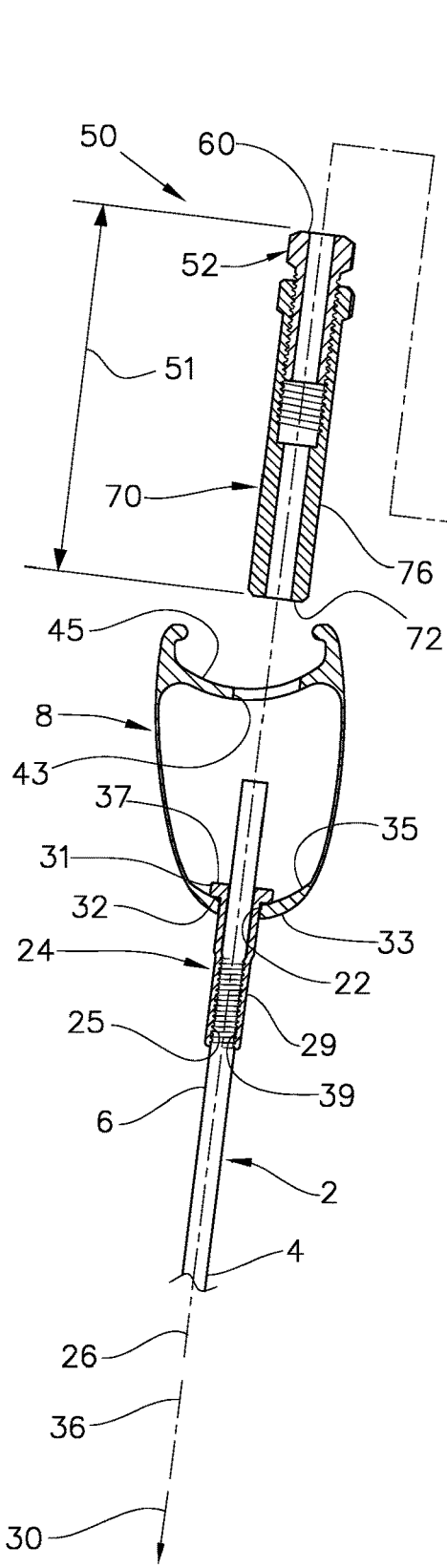

Next, as shown in FIG. 4g, since the engagement interface 25 now serves to lock the spoke 2 to the rim 8 and to maintain the spoke pre-tension 30, the jack assembly 50 may now be threadably loosened to achieve its original collapsed jack dimension 51 with no adverse change in spoke pre-tension 30. This provides clearance such that the spoke 2 may now be severed at a location longitudinally outward of the engagement interface 25 to create a severed end 83 as shown in FIG. 4g. Next, the jack assembly 50, anchor sleeve 40, and excess spoke portion 120 may be removed from the wheel 7. This is repeated for all of the spokes 2 of the wheel 7 and the wheel 7 is now fully assembled and ready for use as shown in FIG. 3a. The second ends 6 of the spokes 2 are now each firmly anchored to the rim 8 by means of their respective engagement interfaces 25 with connectors 24 and their correspondingly individually tuned spoke pre-tension 30 levels are maintained allowing the rim 8 to spin round and true about its axle 9. The engagement interface 25 is robust enough to also support additional loads applied to the wheel 7 during normal use such that this pre-tension 30 and the structural integrity of the wheel 7 will be maintained.

The description of FIG. 4e discusses that each jack assembly 50 be individually manipulated independent of the manipulation of the other spokes of the wheel. As such, the pre-tension 30 of each spoke 2 may be separately adjusted in order to precisely fine tune the balance of pre-tension 30 of the individual spokes 2 as described herein. This is the preferred arrangement. However, it is envisioned that the threaded adjustment of two or more of the jack assemblies 50 may alternatively be linked together or otherwise threadably adjusted in identical amounts. Such an arrangement may be effective in imparting pretension in the spokes very quickly, however it may be more difficult to finely balance the pre-tension 30 of the individual spokes relative to each other, resulting in a wheel that does not rotate as round and true.

It is understood that the crimped engagement interface 25 is but one means to longitudinally lock connect the connector 25 (and the rim 8 connected thereto) to the second end 6 of the spoke 2 after the spoke 2 has been individually and pre-tensioned. A wide range of alternate longitudinal locking means may be substituted. For example, the engagement interface may be a frictional interface such as where the connector may be clamped against the second end 6 of the spoke 2 to create a frictional interface therebetween to provide this longitudinal locking. In another example, the engagement interface may be a mechanically fastened interface, such as where the spoke and connector may both be laterally cross-drilled and with a cross peg extending through these drilled holes to provide this longitudinal locking. In another example, the connector may include a laterally extending threaded hole to receive a set screw with the set screw gripping the spoke to provide this longitudinal locking.

Figure 5A:
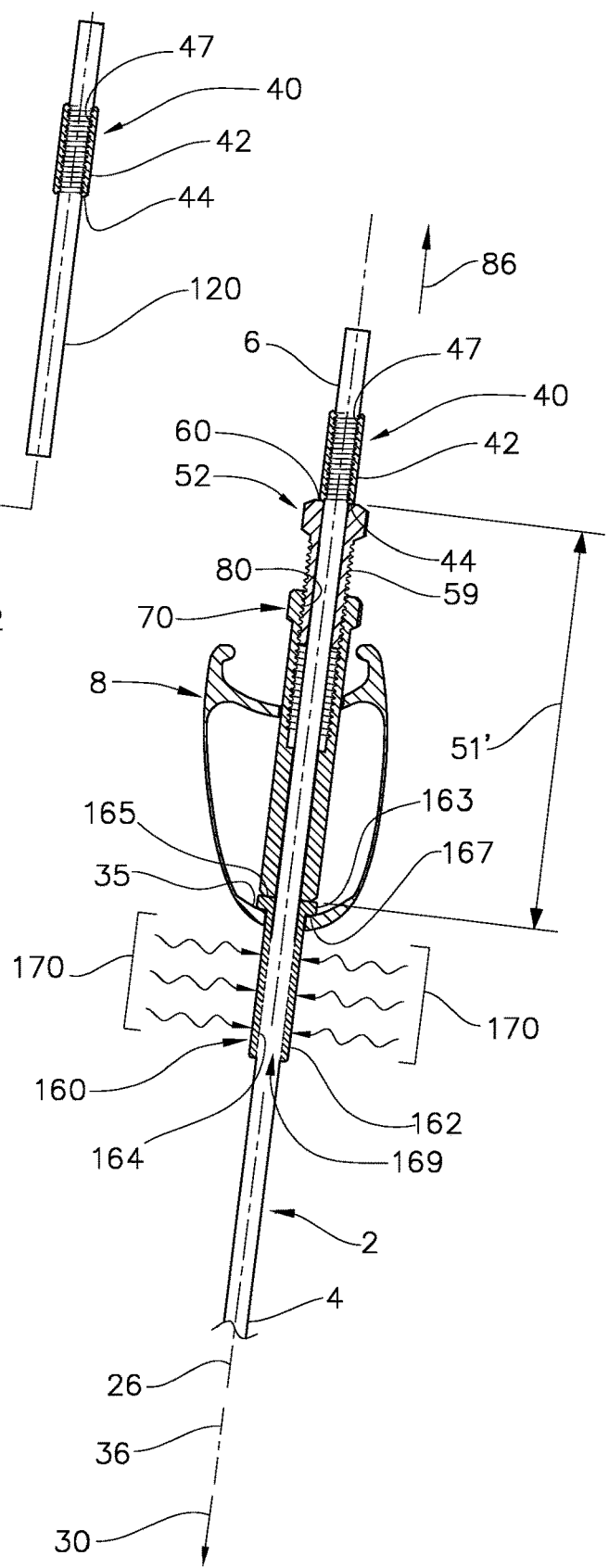
FIG. 5a is a partial cross section view of a second embodiment of the present invention in an assembly sequence corresponding to FIG. 4f, where weld energy is utilized to create a weld interface between the connector and spoke.

In another example, the connector may be fused and/or welded to the spoke to provide this longitudinal locking. One such example is described in FIG. 5a where, instead of crimping, the connector 160 is welded to the spoke 2. All components of FIG. 5a are identical to the embodiment of FIGS. 4a-h with the exception that connector 160 is substituted for connector 24. The connector 160 includes a shank portion 162, an enlarged head portion 163, an end face 165, and a transition surface 167. Connector 160 also includes a hole 169 extending longitudinally therethrough. FIG. 5a corresponds to the assembly sequence described in FIG. 4f, where the jack dimension 51' of the jack assembly 50 has been previously adjusted to achieve the desired spoke pre-tension 30. Instead of crimping force 116, weld energy 170 is applied to connector 160 to fuse and weld the internal surface of hole 169 with the external surface of the longitudinally overlapping portion of the second end 6 of the spoke 2. The result is a fused joinder therebetween at a weld interface 164 to longitudinally lock the spoke 2 to the connector 160. It may be preferable that the weld interface 164 is a longitudinal interface that extends along a longitudinal length. It is understood that this is merely a schematic and exemplary representation of how the spoke 2 may be connected to the rim 8 by means of a fused and/or welded joinder. A wide range of fusing processes may be utilized that are known in industry, including resistance welding, ultrasonic welding, laser welding, induction welding, brazing, soldering, among others. For each of these welding processes, a corresponding type of weld energy 170 is imparted to the weld interface 164, including electrical energy, thermal energy, ultrasonic vibration energy, mechanical energy, induction energy, among others.

Figures 6A, 6B:
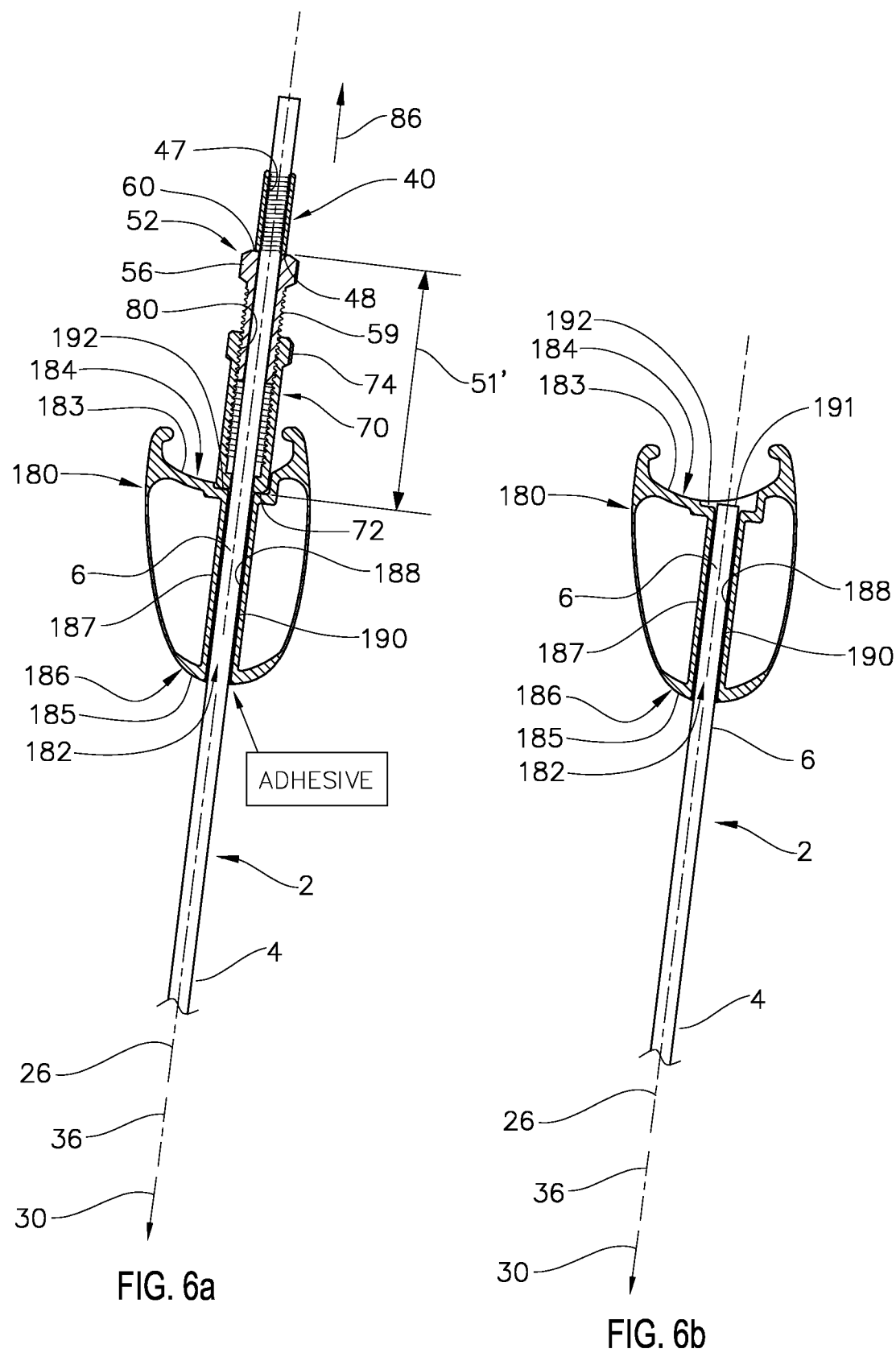
FIG. 6a is a partial cross section view of a third embodiment of the present invention in an assembly sequence corresponding to FIG. 4f, where adhesive is utilized to create a joining interface between the spoke and the rim.
FIG. 6b is a partial cross section view of the embodiment of FIG. 6a, where the jack assembly and the excess spoke portion is removed from the wheel assembly after the adhesive has cured.

In yet another alternate example, the connector may be adhesively joined to the spoke to provide the longitudinal locking therebetween as shown in FIGS. 6a-b. The spoke 2, anchor sleeve 40, and jack assembly 50 are identical to those described in FIGS. 4a-g. The connector 24 is eliminated in favor of a series of spoke holes 182, each in the form of a longitudinal tube 187 shown here to be integrally and monolithically incorporated within the rim 180. The rim 180 includes geometry for mounting of a tire 10 (not shown) and a multiplicity of longitudinal spoke holes 182 that extend from the radially outboard surface 183 of tire bed 184, through tube 187, and through the radially inboard surface 185 of the spoke bed 186 as shown. Each spoke hole 182 may accept an individual spoke 2. The outboard surface 183 includes an indent 192 surrounding the spoke hole 182 for improved seating and alignment of the end face 72 of the sleeve 70. It is noted that the rim 180 shown here is an exemplary representation of a bracing element that may serve as a rim or a hub flange and may take on a wide range of forms. The spokes 2 are preferably constructed of fiber-reinforced material and are connected at their first end 4 to their associated hub flange 16a or 16b and at their second end 6 to the rim 180.

As shown in FIG. 6a, which corresponds to the assembly sequence described in FIG. 4f, the second end 6 of spoke 2 had been passed through the spoke hole 182 in direction 86, with uncured paste adhesive 188 inserted therebetween to fill the lateral gap between the external surface of the second end 6 and the internal surface of the spoke hole 182. The anchor sleeve 40 had been crimped onto the second end 6 in a manner as previously described in FIG. 4d. The jack assembly 50 had next been adjusted to the jack dimension 51' to draw the second end 6 through the hole 182 and to impart pre-tension 30 to the spoke 2 in a manner as previously described in FIG. 4e. Next, while the pre-tension 30 is maintained by the jack assembly 50, the adhesive 141 is allowed to cure and harden such that the second end 6 is thus adhered and longitudinally locked to the spoke hole 182 and correspondingly to the rim 180. Instead of the crimped engagement interface 25 of FIGS. 4a-g or the weld interface 164 of FIG. 5a, FIG. 6a shows an adhesive joining interface 190 to anchor and longitudinally lock the second end 6 to the rim 180. A wide range of adhesive types may be utilized that are known in industry. One such type is epoxy adhesive, which may be cured at room temperature or at elevated temperature.

FIG. 6b corresponds to the assembly sequence of FIG. 4g, where the jack assembly 50 had been threadably loosened to achieve its original collapsed jack dimension (not shown). The joining interface 190 insures that there is no adverse change in spoke pre-tension 30. The spoke 2 had been severed at a location longitudinally outward of the joining interface 190 to create a severed end 191. The jack assembly 50, anchor sleeve 40, and excess spoke portion (not shown) had been removed from the wheel 7 as shown in FIG. 6b. This is repeated for all of the spokes 2 of the wheel 7 and the wheel 7 is now fully assembled and ready for use as shown in FIG. 3a. The second ends 6 of the spokes 2 are now firmly anchored to the rim 8 by means of their respective joining interfaces 190 and their correspondingly individually tuned spoke pre-tension 30 levels are maintained, allowing the rim 180 to rotate round and true about its axle 9. The joining interface 190 is robust enough to also support additional loads applied to the wheel 7 during normal use such that this pre-tension 30 and the structural integrity of the wheel 7 will be maintained.

Figure 7A:
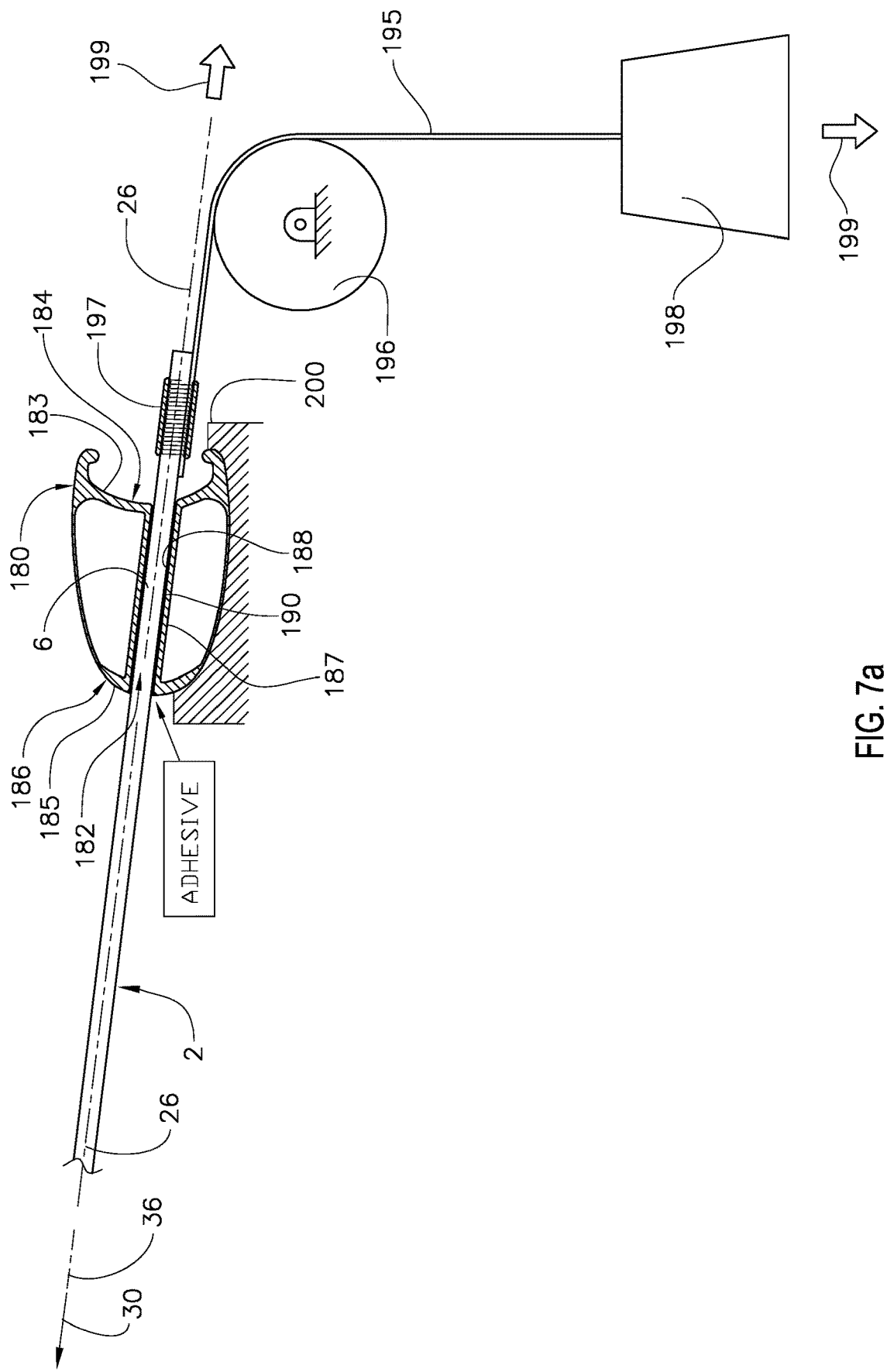
FIG. 7a is a partial cross section view of a fourth embodiment of the present invention in an assembly sequence corresponding to FIG. 4f, where adhesive is utilized to create a joining interface between the spoke and the rim and where spoke pre-tension is created by means of a pulley and a dangling weight connected to a portion of the spoke that is longitudinally outward of the span portion.

It is understood that the embodiments of FIGS. 4a-g, 5a, and 6a-b all show a jack assembly 50 with an end face 72 that bears and/or braces against the rim (either directly or indirectly through a connector) and an end face 60 that bears and/or braces against the second end 6 of the spoke 2 (indirectly by means of anchor sleeve 40) to induce pre-tension in the spoke 2 span. Alternatively, a level of spoke pretension 30 may be applied to the spoke 2 without bearing and/or bracing against the rim. An schematic example of such an arrangement is illustrated in FIG. 7a, which shows pre-tension 30 being created through the force of a dangling weight.

Rim 180 is identical to the rim 180 shown in FIGS. 6a-b with the exception that indent 192 is omitted since it is unnecessary in this arrangement. Spoke 2 extends through spoke hole 182 and a thin cable 195 is secured and fixed to its radially outboard end by means of a crimped sleeve 197 as shown. The cable 185 wraps around a pulley 196 and is attached at its opposite end to a dangling weight 198 as shown. The first end (not shown) of the spoke 2 is anchored to the hub assembly (not shown). The rim 180 is nested in a nest 200 to maintain alignment of the rim 180 during the tensioning process. The hub assembly (not shown) is also fixtured to maintain its radial and axial alignment relative to the rim 180. The dangling weight 198 hangs from the cable 195 with a force 199 corresponding to the weight of the weight 198. The cable 195 wraps around a low-friction pulley to and is coupled to the second end 6 by means of a crimped sleeve 197. Cable 195 pulls on second end 6 with a corresponding force 199, thereby stretching the spoke 2 and imparting a corresponding level of pre-tension 30 in the spoke 2. Uncured paste adhesive 188 has been inserted to fill the lateral gap between the external surface of the second end 6 and the internal surface of the spoke hole 182. This process is repeated for all of the spokes 2 of the wheel 7, with each spoke pre-tensioned by its own corresponding dangling weight 198. While the pre-tension 30 is maintained by the force 199, the adhesive 188 is next allowed to cure and harden such that the second ends 6 of the full complement of spokes 2 are adhered and longitudinally locked to the their respective spoke holes 182 at joining interfaces 190 and correspondingly to the rim 180 in a manner identical to that described in FIGS. 6a-b.

Once the adhesive 188 has cured and the excess spoke material has been trimmed (as described in FIG. 6b), the wheel 7 may be removed from nest 200 and is now fully assembled and ready for use as shown in FIG. 3a. The second ends 6 of the spokes 2 are now each firmly anchored to the rim 8 by means of their respective joining interfaces 190. Since the individual weights 198 utilized to impart pre-tension 30 to each corresponding individual spoke 2 may be identical, the pre-tension 30 of each spoke 2 may correspondingly be balanced and such that the wheel 7 will rotate round and true. However, unlike the embodiments of FIGS.s 4a-g, 5a, and 6a-b, whose jack assemblies 50 brace against the rim, the pre-tension 30 supplied by the weight 198 of the embodiment of FIG. 7a does not compensate for any strain or deflection of the rim 180 due to this pre-tension 30. As such, any such strain or deflection in the rim 180 due to spoke pre-tension 30 may potentially result in a loss and/or variation in the pre-tension 30 of the spokes 2.

While the dangling weight may be easily calibrated to impart pre-tension 30 to the spokes 2 as described, a wide range of alternate means may be utilized to impart such pre-tension to the individual spokes 2 such as corresponding individual pneumatic or hydraulic cylinders, lead screws, individual elastically deflected springs or any other means to apply a force 199 to the second end 6 of the spokes 6. Furthermore, it is envisioned that, instead of the force 199 supplied by the weight 198, the second end 6 may alternatively be positively displaced to stretch the spoke 2 by a controlled distance, thus imparting a pre-tension to the spoke. Furthermore, if desired, the positive displacement applied to each spoke of the wheel 7 may be linked to each other, so that the controlled distance (and resulting pre-tension) applied to all of the spokes 2 is identical. Such a positive displacement may be created with cams, gears, lead screws, among other means known to industry.

It is noted that the embodiments of FIGS. 4a-g, 5a, 6a-b, and 7a apply a pre-tension to the spoke 2 at a region of the spoke 2 that is longitudinally outboard of the span portion of the spoke. While this may be the more convenient location to apply pre-tension, it is also possible to apply pre-tension to the spoke 2 at a point within its span. Such an arrangement is described in the embodiment of FIG. 7b. As shown in FIG. 7b, rim 180 is identical to that shown in FIG. 7a.

Spoke 2 extends through spoke hole 182 and uncured paste adhesive 188 has been inserted to fill the lateral gap between the external surface of the second end 6 and the internal surface of the spoke hole 182. Bell crank 173 is provided with a first arm 174a connected to the spoke 2 (at a location within the span of the spoke 2) by means of a crimped anchor 175 and a second arm 174b connected to a dangling weight 176.

The first end (not shown) of the spoke 2 is anchored to the hub assembly (not shown). The rim 180 is nested in a nest 200 to maintain alignment of the rim 180 during the tensioning process. The hub assembly (not shown) is also fixtured to maintain its radial and axial alignment relative to the rim 180. The dangling weight 176 pulls on the bell crank 173 with a force 177 corresponding to the weight of the weight 176, rotating the bell crank 173 in direction 178, and thereby imparting a similar level of pre-tension 30 in the spoke 2. This pre-tension 30 causes the spoke 2 to stretch and the second end 6 to shift longitudinally outwardly relative to spoke hole 182. While the pre-tension 30 is maintained by the weight 176, the adhesive 188 is next allowed to cure and harden such that the second end 6 of spoke 2 is adhered and longitudinally locked to the spoke hole 182 at joining interface 190 and correspondingly to the rim 180 in a manner identical to that described in FIG. 7a. This pre-tensioning and locking process is repeated for each of the spokes 2 of the wheel 7. Once the adhesive 188 has cured and the crimp anchor 175 is removed from the spoke 2 and the excess spoke material is trimmed (as described in FIG. 6b), the wheel 7 may be removed from nest 200 and is now fully assembled and ready for use as shown in FIG. 3a and as also described in FIG. 7a.

The second ends 6 of the spokes 2 are now each firmly anchored to the rim 8 by means of joining interfaces 190. Since the individual weights 198 and bell cranks 173 are utilized to impart pre-tension 30 to each corresponding individual spoke 2 may be identical, the pre-tension 30 of each spoke 2 may correspondingly be balanced and even such that the wheel 7 will rotate round and true. Like the embodiment of FIG. 7a, the pre-tension 30 supplied by the weight 175 of the embodiment of FIG. 7b does not compensate for any strain or deflection of the rim 180 due to this pre-tension 30. As such, any such strain or deflection of the rim 180 may result in a loss and/or variation in the pre-tension 30 of the spokes 2.

Figure 8:
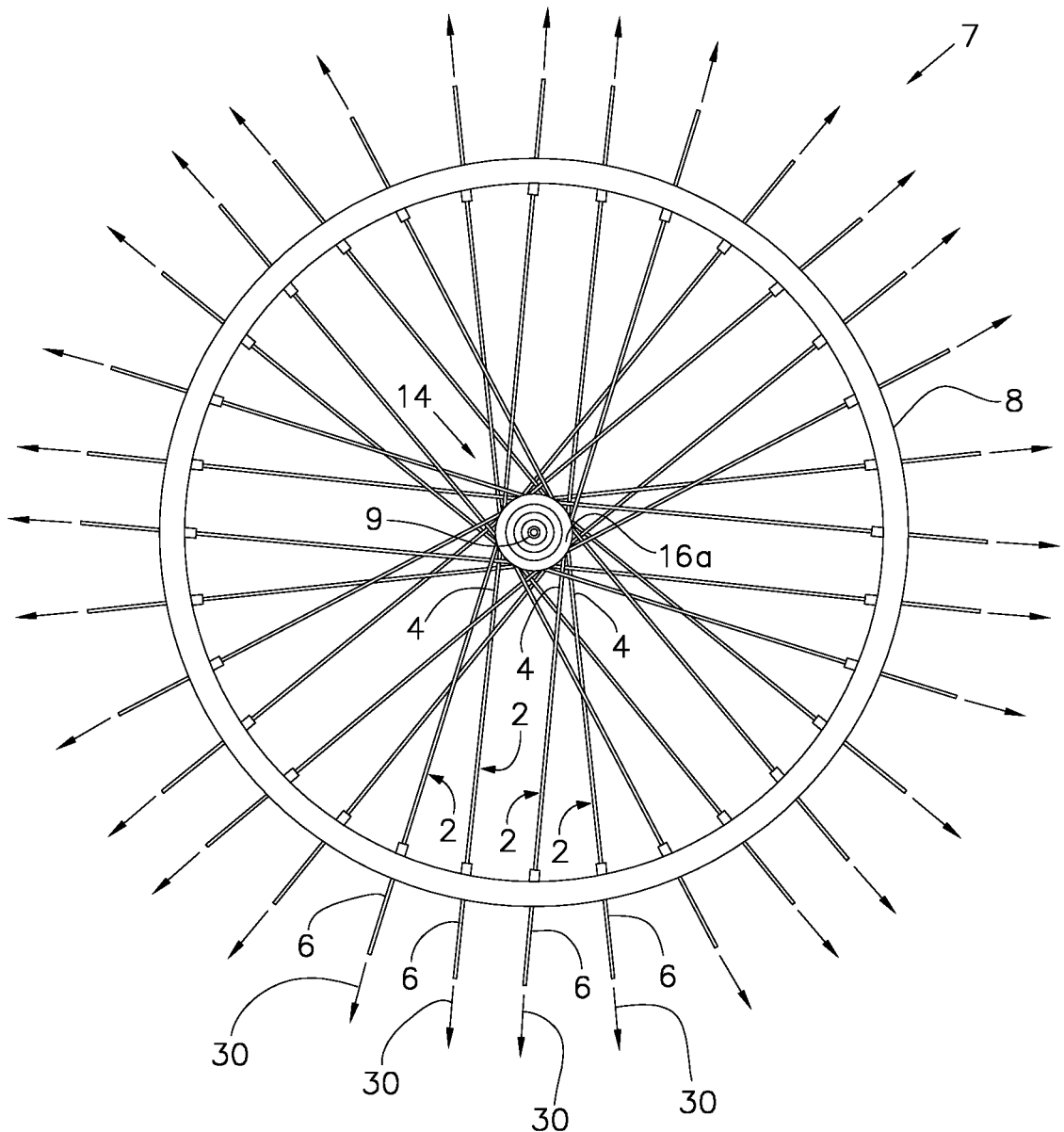
FIG. 8 is a plan view of a wheel assembly, corresponding to the embodiments of FIGS. 4a-g, 5a, 6a-b, and 7a, and schematically illustrating the spoke tension as applied to the full complement of the spokes of the wheel assembly. For clarity, reference numerals are shown for only a representative number of the individual spokes.

FIG. 8 shows a plan view of the wheel assembly 7 corresponding to FIGS. 4a-g, 5a, 6a-b, and 7a. FIGS. 4a-g, 5a, 6a-b, and 7a show the pre-tension 30 and subsequent longitudinal locking as described herein are shown to be applied to an individual spoke 2. FIG. 8 is provided as a schematic representative view corresponding to the embodiments of FIGS. 4a-g, 5a, 6a-b, and 7a to illustrate that these embodiments may be applied to a multiplicity of the spokes 2 of the wheel assembly and preferably to the full complement of the spokes of the wheel assembly 7. FIG. 8 shows the full complement of spokes in an assembly sequence corresponding to FIG. 4e where the spokes 2 are all pre-tensioned 30 prior to their second ends 6 being longitudinally locked to the rim 8 to maintain their pre-tension 30.

While my above description contains many specificities, these should not be construed as limitations on the scope of the invention, but as merely providing exemplary illustrations of some of the preferred embodiments of this invention. For example:

It is noted that, as described in FIGS. 4a-g, the jack assembly 50 serves as a pre-tensioning arrangement that braces between the anchor sleeve 40 and the connector 24 to induce the spoke pre-tension 30. This is preferable since the corresponding bearing load between end face 72 and end face 37 forces the transition surface 32 to be firmly pressed against the outboard surface 35. However, it is noted that alternative pre-tensioning arrangements and/or systems may be substituted that do not brace against the connector 24. For example, the hub assembly 14 and rim 8 may both be firmly clamped to a base plate and an alternate pre-tensioning system may brace between the base plate and the anchor sleeve 40 to induce the spoke pre-tension 30, such as described in FIGS. 7a and 7b.

The embodiment of FIGS. 4a-g describe an arrangement that utilizes the screw thread of the jack assembly 50 to actuate longitudinal pre-tensioning of the spoke, as particularly described in FIG. 4e. It is understood that a wide range of alternative longitudinal pre-tensioning actuation arrangements may be utilized. For example, in place of screw thread actuation, the pre-tensioning arrangement may alternatively utilize a hydraulic or pneumatic cylinder, and/or a cam system, and/or a lever, and/or a hanging weight, and/or a lead screw, among other alternate actuation arrangements known in industry.

It is noted that, in FIGS. 4a-g and FIG. 5a, the engagement interface 25 is located longitudinally inboard from the overlie engagement (between transition surface 32 and outboard surface 35) with the rim 8. This is a preferred arrangement since, with the conventional rim configuration described in FIGS. 3a-b and 4a-g, the shank portion 76 of the connector 25 is longitudinally offset from the bracing element (i.e. rim 8) and is thus exposed so that it may be easily accessed to be crimped at engagement interface 25 to lock the spoke 2 to the rim 8, or otherwise locked to the rim 8 by another means described herein or otherwise known to industry. Alternatively, the engagement interface may be positioned to be is located longitudinally outboard from its overlie engagement with the rim 8. For example, the connector may be arranged to be upside-down, with the end face 37 abutting the outboard surface 35. The shank portion 76 may then be crimped, in a manner similar to that described in FIG. 4f, by means of crimping jaws that are extended through access hole 43.

It is noted that the screw thread of the jack assembly 50 serves to selectively provide an infinite longitudinal resolution of variation in the jack dimension 51. Such an infinite longitudinal resolution is preferred since it allows for very fine adjustment in the pre-tension of the spoke as described in FIG. 4e. However, it is also understood that such infinite resolution is not a requirement and that an alternate pre-tensioning actuation arrangement may provide a longitudinally stepped resolution of the jack dimension 51 where the jack dimension 51 may be varied in discreet steps. For example, the jack assembly may include a linear rack gear and pawl system where the pre-tensioning actuation resolution is limited to the pitch of the rack gear teeth.

It is noted that the second end 6 of the spoke 2 is shown to have a smooth external surface and therefore, the connector 24 may be crimped to engage and longitudinally lock the spoke 2 at an engagement interface 25 positioned at any longitudinal location along the spoke 2 with infinite longitudinal resolution therebetween. However, it is also understood that such infinite resolution is not a requirement and that the connector 24 may be able to engage to the spoke 2 only at predetermined and discreet longitudinal steps. For example, the spoke may have a configured external surface in the form of a series of longitudinally spaced ribs of a given longitudinal pitch and the hole of the connector may correspondingly have a configured internal surface in the form of a series of longitudinally spaced ribs of the same longitudinal pitch. As such, the crimped engagement may only occur at discreet longitudinal stepped locations where the ribs of the spoke nest between the ribs of the hole. In this case, the longitudinal steps correspond to the longitudinal pitch of the ribs.

While the connector of the present invention may be directly connected to the bracing element (such as the rim or the hub), there are many cases where it is desirable to include one or more intermediate connecting elements to facilitate this connection. For example, the connector may engage the intermediate connecting element and the intermediate connecting element may engage the bracing element.

The embodiments shown here show the spokes being held in tension, as in the construction of tension-spoke wheels. This is for common illustration purposes only. It is understood that the spokes of these embodiments may alternatively be configured to be held in compression, corresponding to construction of compression-spoke wheels. In this case, the longitudinal actuation arrangement may be utilized to provide a pre-compression (i.e. a negative pre-tension) to the spoke.

While the above description is particularly focused on bicycle or vehicle wheel spokes as tensile elements, and this is the preferred embodiment of the present invention, however it is envisioned that the present invention may be adapted to applications involving a wide range of tensile element applications outside of vehicle wheel applications. Some example applications may include control cables, guy wires, fiber optic cables, overhead high-tension lines, architectural and infrastructure cabling, pre-stressed rebar, etc.

While the embodiments of FIGS. 4a-g describe a connector 24 with an engagement interface 25 that serves as a termination to provide a means to connect the tensile element (i.e. spoke 2) at the terminus of its span. It is envisioned that the jack assembly 50 and engagement interface may alternatively be positioned within the span itself and serve as a coupling to connect and join two portions of an alternate spoke within its span.

The embodiment of FIGS. 4a-g describes the pre-tensioning and subsequent longitudinal locking to anchor a single individual spoke 2 to the rim 8. It is understood that the full complement of spokes of the wheel assembly may all first be pre-tensioned in a similar manner and then may all be crimped and longitudinally locked as described. It is further understood that each individual spoke may be separately pre-tensioned such that the pre-tension of each spoke is balanced with the other spokes of the wheel assembly 7. Still further, it is envisioned that all of the individual jack assemblies may alternatively be mechanically linked together such that a single adjustment may serve to extend all of the jack assemblies simultaneously. Thus, all of the spokes may be rapidly pre-tensioned in unison. One disadvantage of this alternate arrangement is that it would be more difficult to precisely balance the pre-tension of the spokes.

While the embodiments of FIGS. 3a-b, 4a-g, 5a, 6a-b, 7a, and 7b show the present invention as applied to the connection between the second end 6 of the spoke 2 and the rim 8, it is understood that the present invention may alternatively and/or additionally be applied to the connection between the first end 4 of the spoke 2 and the hub flange 16a and/or 16b. As a general rule, the spokes 2 converge at the hub flange, so there is commonly less room to provide a tensioning and locking means in this region, which is why the connection between the second end 6 and the rim 8 is favored in illustration herein.

It is understood that anchor sleeve 40, crimped sleeve 197, and crimped anchor 175 are provided merely as representative means to provide a connection and/or engagement site on the spoke to which a pre-tensioning means (i.e. jack assembly 50, dangling weights 198 and 176) may be attached and/or braced against. A wide range of alternate means may be substituted to provide such a connection and/or engagement site, such a deformation or head formed directly in the spoke, an adhesively joined site, a welded site, a mechanically fastened site, among others.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

The invention claimed is:

1. A vehicle wheel, comprising:
   a peripheral wheel rim;
   a central hub with an outer flange;
   a plurality of spokes extending between said rim and said hub, each spoke having a first portion connected to said rim, a second portion longitudinally opposed to said first portion and connected to said hub, a span portion between said rim and said hub, a longitudinal axis, and a tensile axis of applied tensile load along said span portion;
   a bracing element including at least a portion of one of said rim and hub;
   a first anchor to connect one of said spokes to one of said rim and said hub at a connection interface;
   wherein said one of said spokes is a spoke that is pre-tensioned by an applied pre-tension load;
   wherein said first anchor may be manipulated between: (i) a released orientation where said connection interface is longitudinally released from said spoke to permit independent longitudinal displacement therebetween; and (ii) an engaged orientation where said connection interface is longitudinally connected to said spoke to limit independent longitudinal displacement therebetween and to maintain said pre-tension of said spoke;
   wherein said applied pre-tension load is applied discreetly from said first anchor.

2. The vehicle wheel according to claim 1, wherein said pre-tension is applied to one of said plurality of spokes by said pre-tension load independently from a pre-tension load applied to another of said plurality of spokes.

3. The vehicle wheel according to claim 1, wherein and said pre-tension load is applied to said spoke at a location that is one of: (i) longitudinally outboard of said connection interface; and (ii) longitudinally inboard of said connection interface.

4. The vehicle wheel according to claim 1, wherein said pretension load is applied independently of said connection interface.

5. The vehicle wheel according to claim 1, wherein said applied pre-tension load is braced between said spoke and at least one of:
   (i) said bracing element; (ii) said first anchor; and (iii) an intermediate element engaged to said bracing element.

6. The vehicle wheel according to claim 1, wherein said applied pre-tension load is braced between said spoke and a connecting element connected to said spoke, wherein said connecting element is crimped to said spoke.

7. The vehicle wheel according to claim 1, wherein said applied pre-tension load is provided by the threadable adjustment of a thread engagement.

8. The vehicle wheel according to claim 1, wherein said applied pre-tension load applies said pre-tension without bracing against said one of said rim and said hub.

9. The vehicle wheel according to claim 1, wherein said first anchor continuously surrounds the cross section of said spoke at said connection interface.

10. The vehicle wheel according to claim 1, wherein said connection interface is a crimped interface.

11. The vehicle wheel according to claim 1, wherein said connection interface is an adhesively joined interface.

12. The vehicle wheel according to claim 1, wherein said connection interface is a fused interface.

13. The vehicle wheel according to claim 1, wherein said connection interface is a longitudinally locked interface to limit both longitudinally inward and longitudinally outward displacement of said spoke relative to said connection interface.

14. The vehicle wheel according to claim 1, wherein said first anchor is at least one of integral and monolithic with said one of said rim and said hub.

15. The vehicle wheel according to claim 1, wherein said connection interface is longitudinally inboard of said bracing element.

16. The vehicle wheel according to claim 1, wherein said first anchor is a connecting element discreet from said one of said rim and said hub.

17. The vehicle wheel according to claim 16, wherein said connecting element is engaged to said bracing element by an overlie engagement to resist said pre-tension.

18. The vehicle wheel according to claim 1, wherein said spoke includes high strength fibers encapsulated in a matrix, and wherein at least a portion of said high strength fibers are aligned generally parallel to said longitudinal axis.

19. A method for assembling a vehicle wheel, wherein said vehicle wheel comprises:
   a peripheral wheel rim;
   a central hub with an outer flange;
   a plurality of spokes extending between said rim and said hub with a first portion connected to said rim, a second portion longitudinally opposed to said first portion and connected to said hub, a span portion between said rim and said hub, a longitudinal axis, and a tensile axis of applied tensile load along said span portion;
   a bracing element including at least a portion of one of said rim and hub;
   said method comprising the steps of:
   (a) initially applying pre-tension to an individual one of said spokes by an applied pre-tension load;
   (b) subsequently longitudinally connecting said individual one of said spokes to said bracing element at a connection interface therebetween while said pre-tension is applied to said spoke;
   whereby said pre-tension is maintained by said connection interface.

20. The method according to claim 19, wherein said applied pretension load is applied by a pre-tensioning mechanism connected to said spoke, including the subsequent step of removing said pre-tensioning mechanism from said vehicle wheel.

21. The method according to claim 19, wherein said applied pre-tension load is braced against an excess portion of said spoke that is longitudinally outboard of said connection interface, including the subsequent step of severing said excess portion, wherein said excess portion is removed from said vehicle wheel.

22. The method according to claim 19, wherein said applied pre-tension load serves to longitudinally displace said spoke relative to said first anchor.

23. The method according to claim 19, said method comprising the steps of:
   (a) initially applying pre-tension to a multiplicity said spokes by said applied pre-tension load;
   (b) subsequently longitudinally connecting said multiplicity of said spokes to said bracing element at said connection interface while said pre-tension is applied to said spoke.

24. The method according to claim 23, wherein said multiplicity of spokes includes the full quantity of said plurality of spokes.

25. The method according to claim 19, wherein said applied pre-tension load is applied discreetly from said connection interface.

26. The method according to claim 19, wherein said connection interface associated with a first one of said plurality of spokes is independent from said connection interface associated with a second one of said plurality of spokes.

27. A method for applying pre-tension to a spoke of a vehicle wheel, wherein said vehicle wheel comprises:
   a peripheral wheel rim;
   a central hub with an outer flange;
   a plurality of spokes, including a first spoke and a second spoke, extending between said rim and said hub, each spoke having a first portion connected to said rim, a second portion longitudinally opposed to said first portion and connected to said hub, a span portion between said rim and said hub, a longitudinal axis, and a tensile axis of applied tensile load along said span portion;
   a bracing element including at least a portion of one of said rim and hub;
   said method comprising the steps of:
   (a) initially applying a first pre-tension load to a first spoke of said plurality of spokes to achieve a first pre-tension of said first spoke and applying a second pre-tension load to a second spoke of said plurality of spokes to achieve a second pre-tension of said second spoke, wherein said first pre-tension load is applied independently of said second pre-tension load;
   (b) subsequently connecting said first spoke to said bracing element at a first connection interface while said first pre-tension load is applied to said first spoke and connecting said second spoke to said bracing element at a second connection interface while said second pre-tension load is applied to said second spoke.

28. The method according to claim 27, wherein said first pretension load is selectively adjusted to achieve said first pre-tension and said pretension load is independently selectively adjusted to achieve said second pre-tension.

* * * * *